(12) United States Patent
Shelton et al.

(10) Patent No.: US 10,287,156 B2
(45) Date of Patent: May 14, 2019

(54) DEVICES AND METHODS FOR HEATING FUEL HOSES AND NOZZLES

(71) Applicant: Dresser, Inc., Austin, TX (US)

(72) Inventors: Artemus A. Shelton, Austin, TX (US); Randal S. Kretzler, Austin, TX (US); Jeffrey Reiter, Austin, TX (US); Daniel Holmes, Austin, TX (US); Bengt I. Larsson, Malmo (SE)

(73) Assignee: Wayne Fueling Systems LLC

(*) Notice: Subject to any disclaimer, the term of this patent is extended or adjusted under 35 U.S.C. 154(b) by 1159 days.

(21) Appl. No.: 14/287,478

(22) Filed: May 27, 2014

(65) Prior Publication Data

US 2015/0298961 A1 Oct. 22, 2015

Related U.S. Application Data

(63) Continuation of application No. 14/286,405, filed on May 23, 2014.
(Continued)

(51) Int. Cl.
*B67D 7/42* (2010.01)
*B67D 7/82* (2010.01)
(Continued)

(52) U.S. Cl.
CPC .......... *B67D 7/82* (2013.01); *B67D 7/42* (2013.01); *B67D 7/84* (2013.01); *F16L 53/38* (2018.01)

(58) Field of Classification Search
CPC .. B67D 7/42; B67D 7/425; B67D 7/82; F16L 53/002; F16L 53/004; F16L 53/008; H05B 3/58
(Continued)

(56) References Cited

U.S. PATENT DOCUMENTS 1,252,614 A 1/1918 Pieper et al.
1,809,714 A 6/1931 Carl
(Continued)

FOREIGN PATENT DOCUMENTS

CN 201024081 Y 2/2008
CN 202132648 U 2/2012
(Continued)

OTHER PUBLICATIONS

U.S. Appl. No. 14/286,405, filed May 23, 2014.
(Continued)

*Primary Examiner* — Phuong T Nguyen
(74) *Attorney, Agent, or Firm* — Mintz Levin Cohn Ferris Glovsky and Popeo, P.C.

(57) ABSTRACT

Various exemplary devices and methods for heating fuel hoses and nozzles are provided. In general, the devices and methods for heating fuel hoses and nozzles can be configured to heat fluid dispensable by a user into a fuel tank or other type of container. In some embodiments, a fuel dispensing device can include a first passageway configured to pass fluid therethrough and can include a second passageway configured to pass heated air therethrough. The heated air passing through the second passageway can be configured to heat the fluid passing through the first passageway. In some embodiments, a fuel dispensing device can include a single hose configured to pass fluid and heated air through separate passageways therein, and the device can include a manifold configured to facilitate passage of the fluid and the heated air from separate sources into the single hose.

23 Claims, 19 Drawing Sheets

Related U.S. Application Data

(60) Provisional application No. 61/981,577, filed on Apr. 18, 2014.

(51) Int. Cl.
*B67D 7/84* (2010.01)
*F16L 53/38* (2018.01)

(58) Field of Classification Search
USPC .......................................... 392/466, 472, 496
See application file for complete search history.

(56) References Cited

U.S. PATENT DOCUMENTS

| | | | |
|---|---|---|---|
| 2,526,405 | A | 10/1950 | Peeps |
| 2,801,323 | A | 7/1957 | Andrew |
| 3,378,673 | A | 4/1968 | Hopper |
| 3,784,785 | A | 1/1974 | Noland |
| 3,832,525 | A | 8/1974 | Stanton et al. |
| 3,932,727 | A | 1/1976 | True |
| 4,372,279 | A | 2/1983 | Parks |
| 4,447,706 | A | 5/1984 | Eder et al. |
| 4,808,793 | A * | 2/1989 | Hurko ............... F24H 1/102 392/480 |
| 4,926,028 | A | 5/1990 | Fortune |
| 5,195,564 | A | 3/1993 | Spalding |
| 5,285,826 | A | 2/1994 | Sanders et al. |
| 5,355,915 | A | 10/1994 | Payne |
| 5,542,458 | A | 8/1996 | Payne et al. |
| 5,832,178 | A | 11/1998 | Schave |
| 5,859,953 | A | 1/1999 | Nickless |
| 5,868,175 | A | 2/1999 | Duff et al. |
| 5,992,395 | A | 11/1999 | Hartsell, Jr. et al. |
| 6,109,826 | A | 8/2000 | Mertes |
| 6,357,493 | B1 | 3/2002 | Shermer et al. |
| 6,427,717 | B1 | 8/2002 | Kimura |
| 6,499,516 | B2 | 12/2002 | Pope et al. |
| 6,710,302 | B1 * | 3/2004 | Rennick ............... G01S 15/04 219/202 |
| 6,810,922 | B1 | 11/2004 | Grantham |
| 6,835,223 | B2 | 12/2004 | Walker et al. |
| 6,899,149 | B1 | 5/2005 | Hartsell, Jr. et al. |
| 6,915,638 | B2 | 7/2005 | Runkle et al. |
| 6,923,221 | B2 | 8/2005 | Riffle |
| 8,455,800 | B2 | 6/2013 | Tix et al. |
| 8,604,392 | B1 | 12/2013 | Ostrom et al. |
| 9,637,370 | B2 | 5/2017 | Shelton et al. |
| 2007/0212037 | A1 | 9/2007 | Koenekamp et al. |
| 2008/0271801 | A1 | 11/2008 | Sonderegger et al. |
| 2011/0272063 | A1 | 11/2011 | Tumarkin |
| 2012/0024892 | A1 * | 2/2012 | Bartlett ............... B67D 7/04 222/54 |
| 2013/0125989 | A1 | 5/2013 | Clever et al. |
| 2014/0261762 | A1 | 9/2014 | Barendregt et al. |
| 2015/0298962 | A1 | 10/2015 | Shelton et al. |
| 2015/0300550 | A1 | 10/2015 | Shelton et al. |
| 2016/0280532 | A1 * | 9/2016 | McClelland ............. B67D 7/02 |

FOREIGN PATENT DOCUMENTS

| | | |
|---|---|---|
| CN | 202139039 U | 2/2012 |
| DE | 202005010318 | 9/2005 |
| DE | 202013006358 U1 | 7/2013 |
| DE | 202014000767 U1 | 2/2014 |
| EP | 2075218 A1 | 7/2009 |
| WO | WO-11054400 A1 | 5/2011 |
| WO | WO-2012010245 A1 | 1/2012 |
| WO | WO-2012/103437 A2 | 8/2012 |
| WO | WO-2015/063387 A1 | 5/2015 |

OTHER PUBLICATIONS

U.S. Appl. No. 14/568,729, filed Dec. 12, 2014.
U.S. Appl. No. 14/678,486, filed Apr. 3, 2015.
U.S. Appl. No. 13/743,151, filed Jan. 16, 2013.
Partial International Search Report for PCT/US2015/025583 dated Jul. 23, 2015.

* cited by examiner

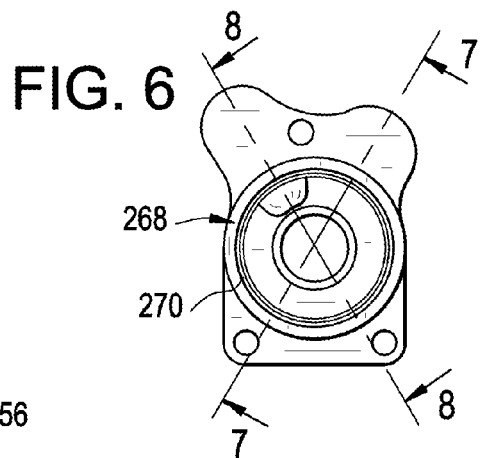
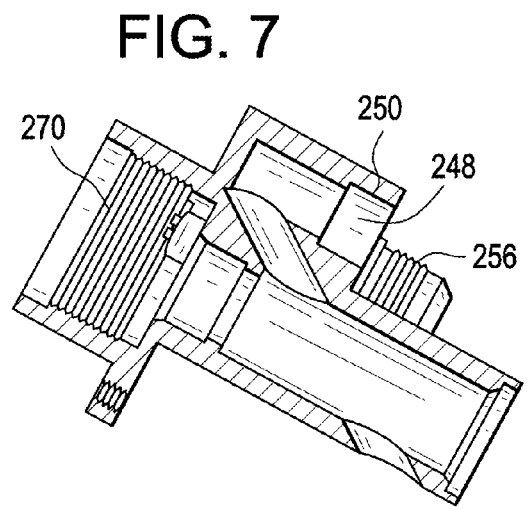
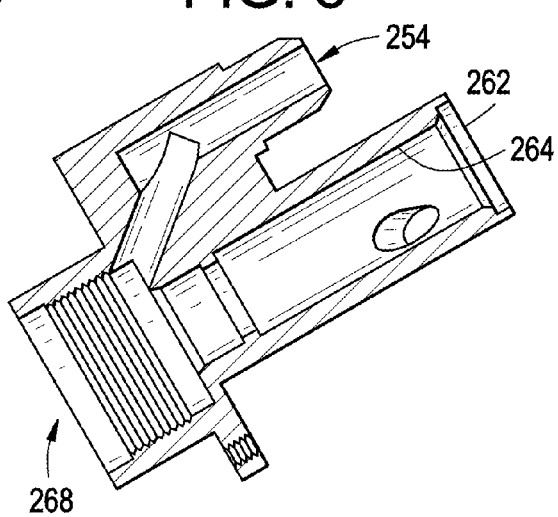
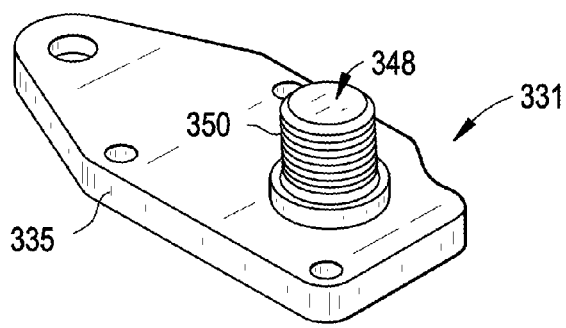

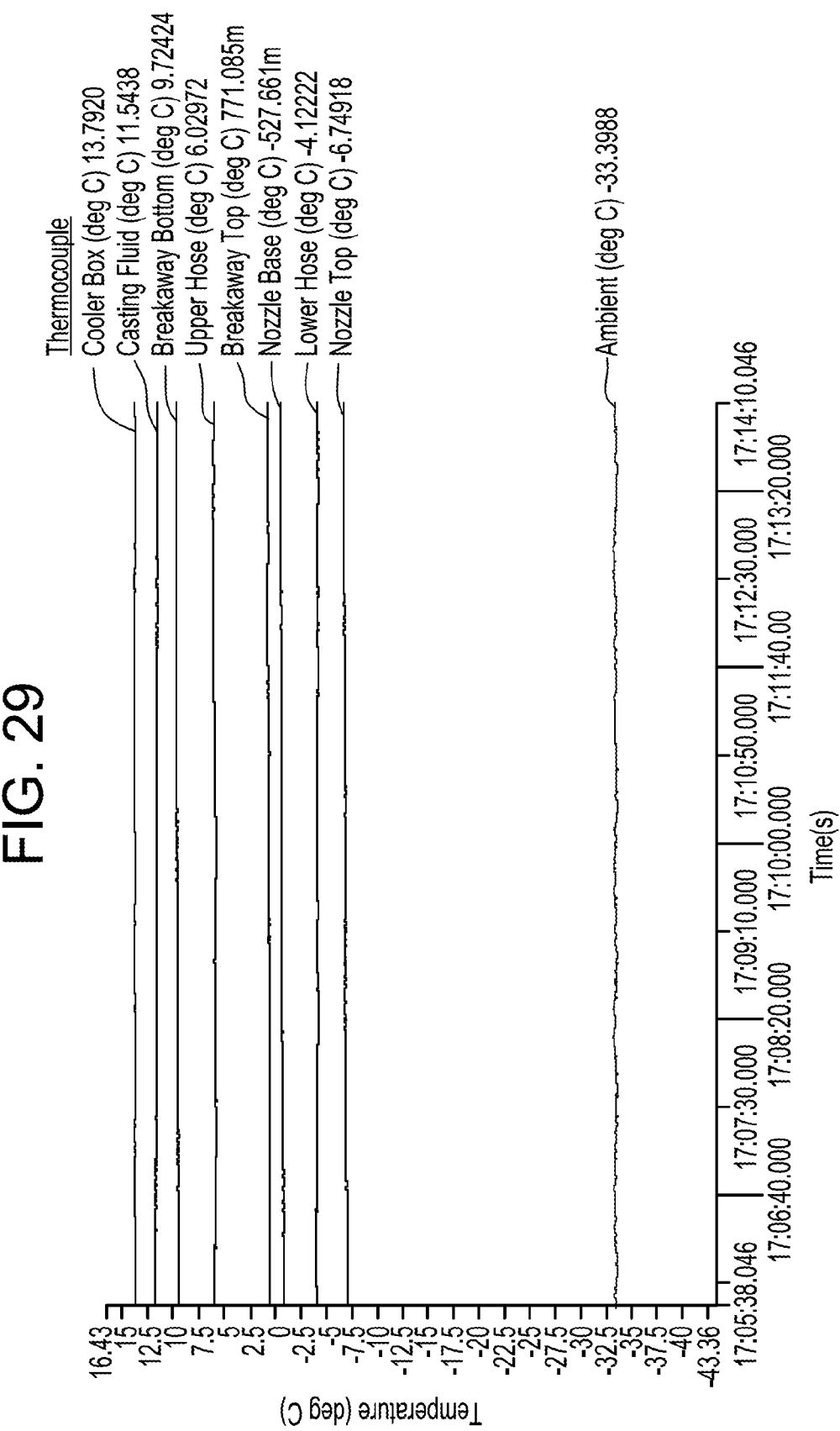

DEVICES AND METHODS FOR HEATING FUEL HOSES AND NOZZLES

CROSS REFERENCE

The present application claims priority to U.S. application Ser. No. 14/286,405 entitled "Devices And Methods For Heating Fuel Hoses And Nozzles" filed May 23, 2014 and to U.S. Provisional Application No. 61/981,577 entitled "Devices And Methods For Heating Fuel Hoses And Nozzles" filed Apr. 18, 2014, which are hereby incorporated by reference in their entireties.

FIELD

The subject matter disclosed herein relates to devices and methods for heating fuel hoses and nozzles.

A typical fueling environment includes one or more fuel dispensers which can be used by a customer to dispense fuel into a vehicle, a portable fuel tank, or other equipment. Fuel dispensers are often located outside where they are exposed to weather, which can include exposure to low temperatures. The low temperatures can in some instances be below the freezing temperature of fluid being dispensed therefrom, which can cause the fluid to freeze. The fluid therefore cannot be dispensed in response to user demand and/or the fuel dispenser can be damaged by the frozen fluid. Even if the low temperatures are not sufficiently low so as to cause the fluid to entirely freeze, the temperatures can be low enough to cause the fluid to begin a transition to being frozen, which can cause the fluid dispenser to become clogged with ice crystals, slush, etc.

Heated cabinets for fuel dispensers have been developed to help prevent fluid from freezing outdoors. However, the heated cabinets can be aesthetically unpleasing, can be cumbersome by being large and/or unwieldy, and/or can provide inefficient heating. Another approach that has been developed to help prevent fluid from freezing outdoors has been to contain a hose and/or nozzle of the fuel dispenser within a shroud. However, the shroud can be aesthetically unpleasing, can be cumbersome by getting in the way of a user's handling of the fuel dispenser, and/or can provide inefficient heating.

Accordingly, there remains a need for devices and methods for heating fuel hoses and nozzles.

BRIEF DESCRIPTION

Devices and methods for heating fuel hoses and nozzles are generally disclosed herein.

In one embodiment, a fuel dispensing device is provided that includes a hose, a heat element, and a nozzle. The hose can have first and second passageways extending longitudinally therethrough. The first passageway can be configured to pass fluid therethrough, the second passageway can be adjacent to and independent from the first passageway, and the second passageway can be configured to pass air therethrough. The heat element can be in communication with the second passageway and can be configured to heat the air passing through the second passageway, thereby heating the fluid within the first passageway that is adjacent the second passageway. The nozzle can be attached to a distal end of the hose. The first passageway can extend therethrough such that the fluid is allowed to exit a distal opening of the first passageway to be dispensed from the nozzle, the second passageway can have a distal opening that is proximal to the distal opening of the first passageway, and the distal opening of the second passageway can allow the air to pass therethrough.

In another embodiment, a fuel dispensing device can include a hose, a nozzle, and a manifold. The hose can have first and second passageways extending therethrough. The first passageway can be configured to pass fluid therethrough, and the second passageway can be configured to pass heated air therethrough. The nozzle can be attached to the hose, can have the first and second passageways extending therethrough, can be configured to dispense the fluid from the first passageway, and can be configured to release the heated air. The manifold can have a first opening configured to communicate with the first and second passageways, can have a second opening in fluid communication with the first opening and configured to communicate with a fluid supply that supplies the fluid to the first passageway, and can have a third opening in fluid communication with the first opening and configured to communicate with an air supply that supplies the air to the second passageway. The manifold can be configured to prevent the fluid passing through the first and second openings from mixing with the air passing through the first and third openings.

In another embodiment, a fuel dispensing device includes a hose configured to pass fluid therethrough, a nozzle attached to a distal end of the hose, a housing, a heat element, a sensor, and a controller. The nozzle can be configured to receive the fluid from the hose, can be configured to dispense the fluid from a distal end thereof, and can be configured to pass air therethrough such that air is allowed to pass through an opening of the nozzle. The fluid and the air can be prevented from mixing together within the nozzle. The housing can have a cavity configured to releasably seat the nozzle therein. The heat element can be configured to heat the air passing through the nozzle. The sensor can be configured to sense a temperature. The controller can be configured to allow the heat element to provide heat therefrom when the sensed temperature is above a predetermined threshold temperature, and the controller can be configured to prevent the heat element from providing heat when the sensed temperature is below the predetermined threshold temperature.

In another embodiment, a fuel dispensing device includes a hose, a nozzle, a heat element, a sensor, and a controller. The hose can have a first passageway extending longitudinally therethrough. The first passageway can be configured to pass fluid therethrough. The nozzle can be attached to a distal end of the hose. The first passageway can extend therethrough such that the fluid is allowed to be dispensed from the nozzle. The nozzle can include a second passageway extending therethrough and being configured to pass air therethrough such that air is allowed to pass through an opening of the nozzle. The second passageway can be adjacent to and independent from the first passageway. The heat element can be configured to heat the air passing through the second passageway. The sensor can be configured to sense a temperature adjacent the opening of the nozzle. The controller can be configured to allow the heat element to provide heat therefrom when the sensed temperature is above a predetermined threshold temperature, and the controller can be configured to prevent the heat element from providing heat when the sensed temperature is below the predetermined threshold temperature.

In another aspect, a fuel dispensing method is provided that in one embodiment includes allowing passage of fluid through a first passageway of a fuel dispensing system and out of the fuel dispensing system through a nozzle of the fuel dispensing system, and forcing heated air through a second passageway of the fuel dispensing system. The second passageway can be disposed within the first passageway, a sidewall defining the second passageway can prevent the heated air within the second passageway from mixing with the fluid within the first passageway, the heated air can heat the fluid within the first passageway, and the heated air can pass through the fuel dispensing system through the nozzle.

In another embodiment, a fuel dispensing system can include allowing passage of fluid through a first passageway of a fuel dispensing system and out of the fluid dispensing system through a nozzle of the fuel dispensing system, and forcing heated air through a second passageway of the fuel dispensing system. The second passageway can be adjacent to the first passageway such that the heated air within the second passageway heats the fluid within the first passageway. The first passageway can be separate from the second passageway so as to prevent the heated air within the second passageway from mixing with the fluid within the first passageway. The method can also include allowing the heated air to exit the second passageway into a cavity of the fuel dispensing system, sensing a temperature, and heating the air when the sensed temperature is above a predetermined threshold temperature and not heating the air when the temperature is below the predetermined threshold temperature.

BRIEF DESCRIPTION OF THE DRAWING

These and other features will be more readily understood from the following detailed description taken in conjunction with the accompanying drawings, in which:

FIG. 6 is a top schematic view of the manifold of FIG. 5;

FIG. 7 is a cross-sectional schematic view of the manifold of FIG. 6;

FIG. 8 is another cross-sectional schematic view of the manifold of FIG. 6;

FIG. 9 is a perspective schematic view of a top portion of another embodiment of a manifold of a fuel dispensing device;

FIG. 29 is a graph showing temperature versus time for a test of an embodiment of a fuel dispensing device including a 220 W heat cable having air supplied thereto from a compressor.

Figure 1:
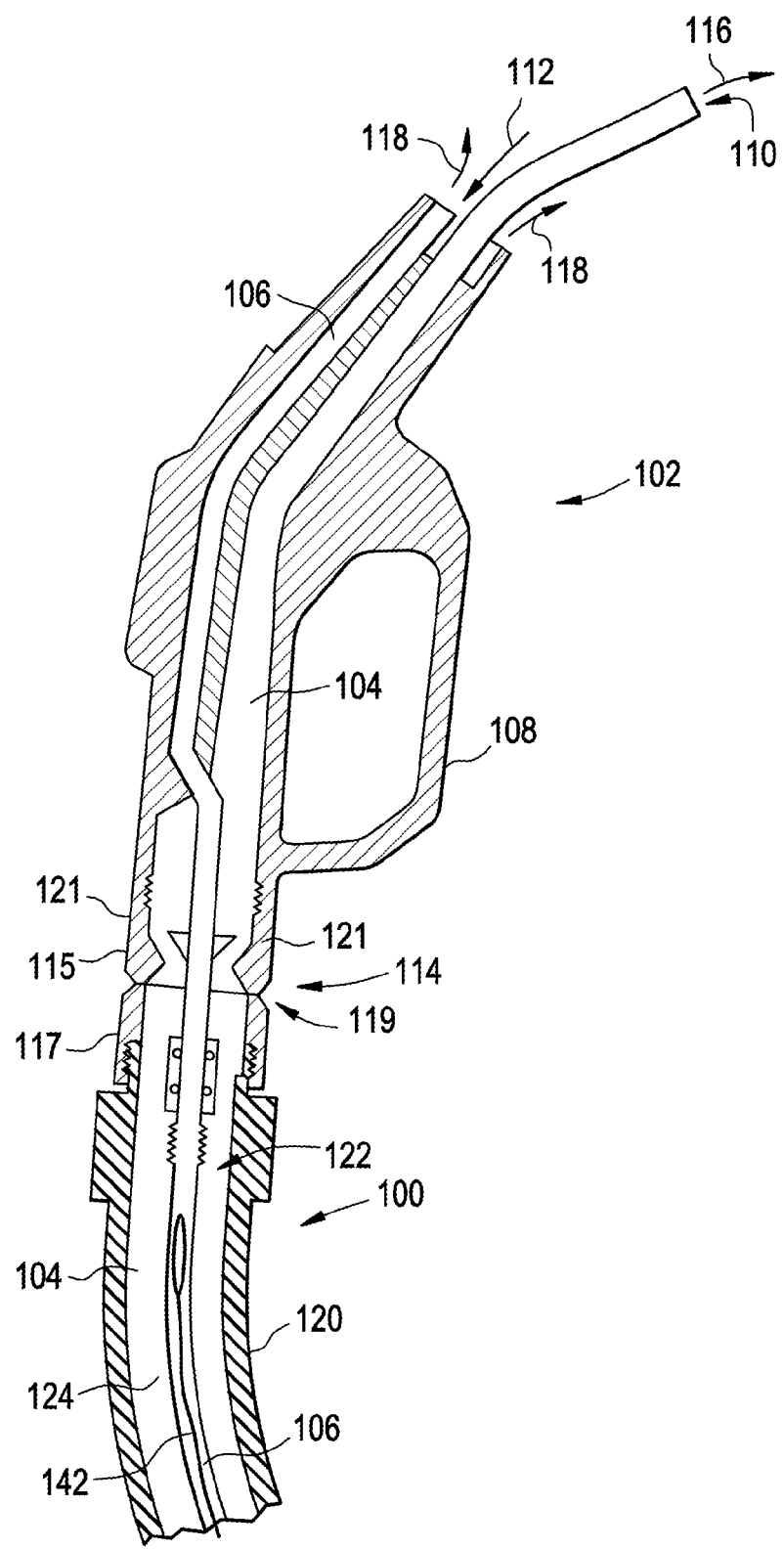
FIG. 1 is a side cross-sectional view of one embodiment of a hose and a nozzle of a fuel dispensing device.

It is noted that the drawings are not necessarily to scale. The drawings are intended to depict only typical aspects of the subject matter disclosed herein, and therefore should not be considered as limiting the scope of the disclosure. In the drawings, like numbering represents like elements between the drawings.

DETAILED DESCRIPTION

Certain exemplary embodiments will now be described to provide an overall understanding of the principles of the structure, function, manufacture, and use of the devices, systems, and methods disclosed herein. One or more examples of these embodiments are illustrated in the accompanying drawings. Those skilled in the art will understand that the devices, systems, and methods specifically described herein and illustrated in the accompanying drawings are non-limiting exemplary embodiments and that the scope of the present invention is defined solely by the claims. In the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. The features illustrated or described in connection with one exemplary embodiment may be combined with the features of other embodiments. Such modifications and variations are intended to be included within the scope of the present invention.

Various exemplary devices and methods for heating fuel hoses and nozzles are provided. The devices and methods disclosed herein produce a number of advantages and/or technical effects.

In general, the devices and methods for heating fuel hoses and nozzles can be configured to heat fluid dispensable by a user into a fuel tank or other type of container, thereby helping to prevent the fluid from freezing if the fluid is in an environment having a temperature below the fluid's freezing point. In some embodiments, a fuel dispensing device can include a first passageway configured to pass fluid therethrough and can include a second passageway configured to pass heated air therethrough. The heated air passing through the second passageway can be configured to heat the fluid passing through the first passageway. The first and second passageways can be independent from one another such that the air does not mix with the fluid and, hence, does not dilute or otherwise affect the integrity of the fluid. The first and second passageways can be coaxial with one another with the second passageway being disposed within the first passageway, e.g., a tube passing the heated air being disposed within a tube passing the fluid. The first and second passageways can extend through a hose and a nozzle of the fuel dispenser, which can help prevent the fluid from freezing within either of the hose or the nozzle. The fluid can be configured to be heated from within the hose and the nozzle, which can allow the fluid to be heated without any external heating components being visible to the user dispensing the fluid, thereby allowing for a more visually appealing fuel dispenser and/or allowing the fluid to be heated without heating-related components being physically in the user's way when the user is dispensing the fluid so as to make using the dispenser cumbersome and/or require user movement of a shroud before dispensing fluid. Because the heat source that heats the fluid can be very close to the fluid, as opposed to various traditional heating techniques such as heated cabinets, lower wattage can be used to heat the fluid, thereby reducing adverse effects of thermodynamic loss, improving efficiency, saving energy, and/or reducing monetary cost. The air can enter the hose in an unheated state or in a heated state. If the air enters the hose in an unheated state, the fuel dispenser can be configured to heat the air after the air enters the hose, such as with a heating element disposed at least partially within the hose.

In some embodiments, a fuel dispensing device can include a single hose configured to pass fluid and heated air through separate passageways therein, and the device can include a manifold configured to facilitate passage of the fluid and the heated air from separate sources into the single hose. The manifold can include first, second, and third coupling elements. The first coupling element can be configured to attach to a proximal end of the hose. A distal end of the hose can be configured to attach to a nozzle configured to dispense the fluid therefrom. The second coupling element can be in fluid communication with the first coupling element, and can be configured to couple to a fluid source (e.g., a reservoir, a tank, etc.) that supplies the fluid. The third coupling element can be in fluid communication with the first coupling element without being in fluid communication with the second coupling element, and can be configured to couple to an air supply (e.g., an air pump, an air compressor, etc.) that supplies the air. The manifold can thus be configured to allow the fluid and the air to simultaneously flow through the single hose while allowing the fluid to be heated without the air heating the fluid mixing with the fluid. The air supply can be configured to supply the air in an unheated state or in a heated state. If the air supply supplies the air in an unheated state, the fuel dispenser can be configured to heat the air after being supplied thereto, such as with a heating element.

The fuel dispensing devices described herein can be configured to dispense any kind of fluid, as will be appreciated by a person skilled in the art. In some embodiments, the fluid can include a fuel of any type of ammonia/water blend usable in automobiles. In an exemplary embodiment, the fuel dispensing devices described herein can be configured to dispense diesel exhaust fluid (DEF), e.g., AdBlue®. DEF has a freezing temperature of 12° F. (−11° C.), which can make heating of DEF using the devices and methods described herein desirable in geographic areas with colder climates that may have temperatures near or below 12° F. at any point during the year.

FIG. 1 illustrates an embodiment of a fuel dispensing device configured to heat fluid 104 that can be dispensed therefrom. The device can include a hose 100 and a nozzle 102. The fuel dispensing device can also include a movable element 114, also referred to herein as a "swivel," disposed between the hose 100 and the nozzle 102 that can be configured to allow the nozzle 102 to be selectively oriented relative to the hose 100. In general, the hose 100 and the nozzle 102 can each be configured to have the fluid 104 pass therethrough and to have a gas, e.g., air 106, pass therethrough. The air 106 can be configured to heat the fluid 104 non-invasively such that the air 106 does not mix with the fluid 104 within the hose 100 or within the nozzle 102. The nozzle 102 can be configured to release the fluid 104 and the air 106 therefrom. The nozzle 102 can be configured to selectively release the fluid 104 therefrom through a fluid exit opening 110, e.g., in response to user manipulation of a dispensing trigger 108 of the nozzle 102, as generally indicated by a fluid exit arrow 116. The nozzle 102 can be configured to automatically pass the air 106 therethrough by releasing the fluid 104 therefrom through an air exit opening 112, as generally indicated by air exit arrows 118. The fuel dispensing device can thus dispense the fluid 104 on demand in accordance with a user's typical expectations of fluid dispensing, e.g., at a gas station, while also providing for heating of the fluid 104 so as to reduce chances of the fluid 104 freezing within the hose 100 and/or within the nozzle 102.

The hose 100 can be configured as a coaxial hose and include a plurality of coaxial tubes. In this illustrated embodiment, the hose 100 includes an outer tube 120 and an inner tube 124 coaxial with and disposed within the outer tube 120. For example, another embodiment of a hose (not shown) can include two tubes similar to the outer and inner tubes 120, 124 and include at least one protective outer tubes therearound.

The outer tube 120 and the inner tube 124 can have a variety of sizes, shapes, and configurations. In an exemplary embodiment, the inner tube 124 can have an inside diameter, e.g., diameter of its interior lumen, that is about two-thirds of its outside diameter. For example, the inner tube 124 can have an outside diameter in a range of about 0.75 in. (19.05 mm) to 0.83 in. (21.0 mm) and an inside diameter of about 0.5 in.

The outer tube 120 can be configured as a protective member to help prevent the fluid 104 and/or the air 106 from escaping from the hose 102. The outer tube 120 can be flexible, which can facilitate user manipulation of the hose 100.

A gap of space 122 can be defined between an inner surface 123 of the outer tube 120 and an outer surface 125 of the inner tube 124. The space 122, also referred to herein as a "fluid cavity" and an "fluid passageway," can be configured to pass the fluid 104 therethrough. The fluid 104 can be configured to be selectively advanced through the space 122 in response to user actuation of the trigger 108, as will be appreciated by a person skilled in the art.

The fluid cavity 122 can be configured to be in fluid communication with a fluid supply that stores a supply of fluid to be dispensed using the hose 100 and the nozzle 102.

Figure 2:
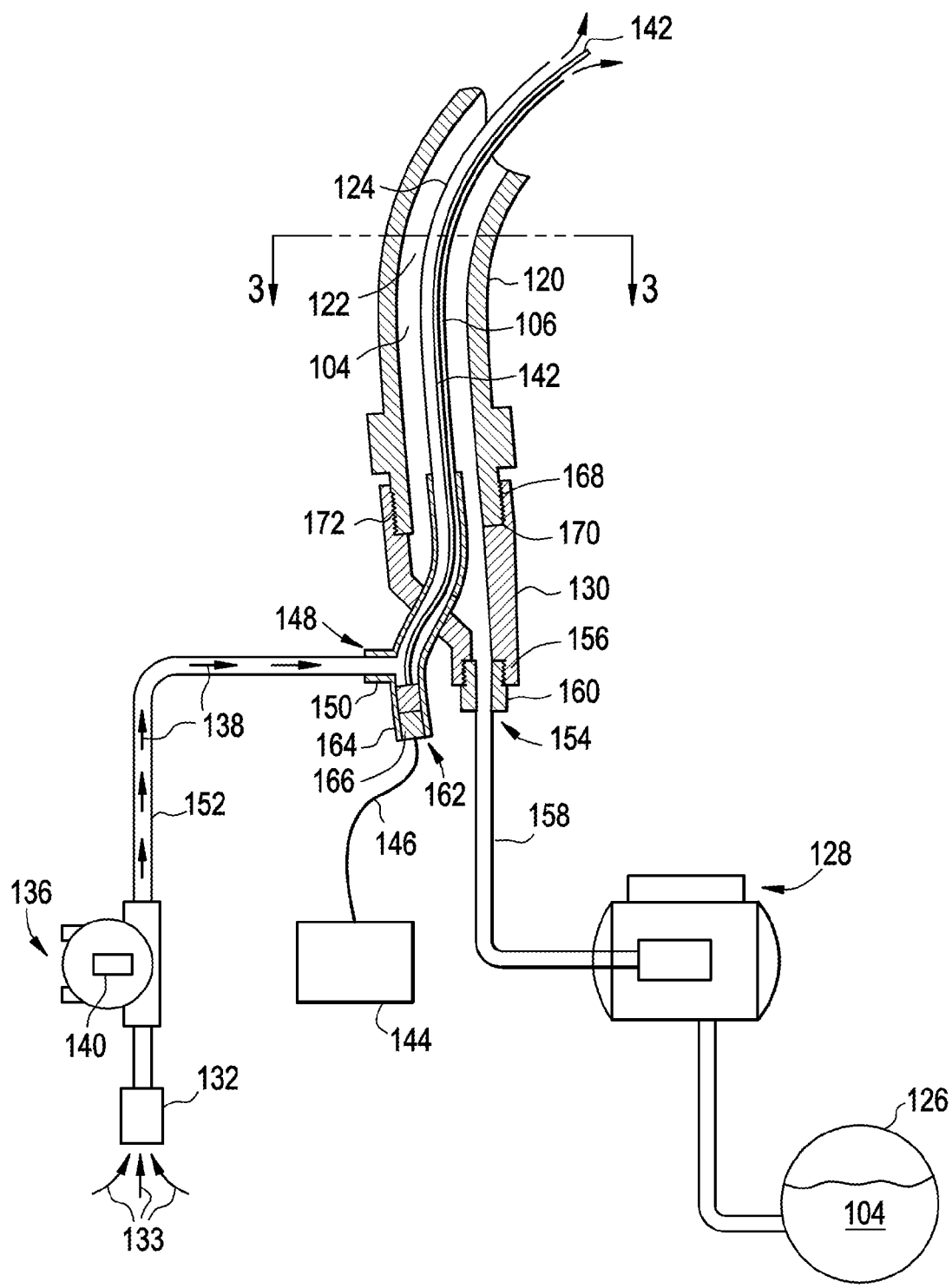
FIG. 2 is a side, partially cross-sectional view of the hose of FIG. 1 attached to a manifold that is attached to a fluid supply, an air supply, and a power supply and control.

The fluid supply can have a variety of configurations, as will be appreciated by a person skilled in the art. FIG. 2 illustrates an embodiment of a fluid supply 126 that can be in fluid communication with the fluid cavity 122. The fluid supply 126 in this illustrated embodiment is in the form of a reservoir configured to be located underground. The fluid 104 can be configured to be advanced into the fluid passageway 122 from the fluid supply 126 through a fluid meter 128. The fluid meter 128 can be configured to measure an amount of fluid 104 dispensed from the fluid supply 128, as will be appreciated by a person skilled in the art, in order to, e.g., assess proper billing for dispensed fluid. The fluid 104 can also pass through a manifold 130 between the fluid supply 126 and the space 122, as discussed further below. The fluid meter 128 can be coupled to a housing (not shown) of the fuel dispensing device and can be located entirely inside the housing, entirely outside the housing, or partially inside and partially outside the housing. Locating the fluid meter 128 at least partially outside the housing can facilitate repair and/or upgrade of broken or outdated parts without requiring opening of the housing at all and/or opening of the housing in an easier way than if the part being repaired and/or upgraded is entirely within the housing.

The inner tube 124, also referred to herein as an "air tube" and an "air passageway," can be configured to pass the air 106 therethrough. The air 106 can be configured to flow through the air tube 124 without user intervention. In other words, the air 106 can be configured to automatically flow through the air tube 124. The air 106 can thus be configured to automatically heat the fluid 104 in the space 122 surrounding the air tube 124, as discussed further below. The inner tube 124 can be flexible, which can facilitate user manipulation of the hose 100.

The air tube 124 can be configured to be in fluid communication with an air supply that provides air flow through the air tube 124. The air supply can have a variety of configurations, as will be appreciated by a person skilled in the art. The air supply can be coupled to a housing (not shown) of the fuel dispensing device and can be located entirely inside the housing, entirely outside the housing, or partially inside and partially outside the housing. Locating the air supply at least partially outside the housing can facilitate repair and/or upgrade of broken or outdated parts without requiring opening of the housing at all and/or opening of the housing in an easier way than if the part being repaired and/or upgraded is entirely within the housing. FIG. 2 illustrates an embodiment of an air supply that can be in fluid communication with the air tube 124. An intake opening 132 can be configured to allow air to pass therethrough in a direction toward a pump 136. The intake opening 132 can include, for example, a check valve configured to allow passage therethrough in one direction, e.g., toward the hose 100, while preventing passage therethrough in an opposite direction, e.g., away from the hose 100, as shown by air intake directional arrows 134. The intake opening 132 can be configured to allow ambient air to enter therein and/or a dedicated air source can be coupled to the intake valve 132 to provide air thereto.

The air supply can include a pump 136 positioned between the intake valve 132 and the air tube 124. The pump 136 can be configured to force air that enters the intake opening 132 in a direction toward the hose 100, as indicated by air flow directional arrows 138. The pump 136 can thus be configured to direct air flow through the air tube 124, e.g., supply air thereto. In addition to or instead of the pump 136, the air supply can include an air compressor configured to provide compressed or pressurized air to the air tube 124.

The pump 136 can be configured to run continuously so as to continuously force the air 106 through the air tube 124. Continuously running the air 106 through the air tube 124 can help ensure that the fluid 104 within the hose 100 and/or the nozzle 102 does not freeze since heated air can continuously flow adjacent the fluid 104. Alternatively, the pump 136 can be configured to run non-continuously, e.g., intermittently, such that the air 106 is only sometimes forced through the air tube 124. Non-continuously running the air 106 through the air tube 124 can help reduce wear and tear on the pump 136 and/or can help prevent the air 106 from flowing through the air tube 124 when the fluid 104 is not at a temperature at which it may freeze or begin to freeze.

The pump 136 can be configured to not pump the air 106 based on a measured temperature. If the measured temperature is above a predetermined threshold temperature, then the pump 136 can be configured to not pump the air 106 since at such a measured temperature the fluid 104 can be presumed to not be in danger of freezing. If the measured temperature is below the predetermined threshold temperature, then the pump 136 can be configured to pump the air 106 since at such a measured temperature the fluid 104 can be presumed to be in danger of freezing. The predetermined threshold temperature can be based on a freezing point of the fluid 104. In some embodiments, the predetermined threshold temperature can be the fluid's freezing temperature. In other embodiments, the predetermined threshold temperature can be slightly above the fluid's freezing temperature, e.g., 3° above the fluid's freezing temperature, 5° above the fluid's freezing temperature, etc.

In some embodiments, the measured temperature can be a sensed temperature of the fluid 104 in the hose 100 and/or in the nozzle 102. The fluid's temperature in the hose 100 and/or in the nozzle 102 can be sensed using a temperature sensor, as will be appreciated by a person skilled in the art. Using the fluid's temperature as a trigger for the pump's pumping action can help accurately control air flow on an as-needed basis, but positioning a sensor to measure the fluid's temperature can increase a size of the hose 100 and/or the nozzle 102 and/or impede flow of the fluid 104 within the space 122. Any number of sensors can be used to measure fluid temperature.

In some embodiments, the measured temperature can be an ambient temperature outside of the hose 100 and outside of the nozzle 102, e.g., an ambient outdoor temperature. The ambient temperature can be sensed using a temperature sensor, as will be appreciated by a person skilled in the art. Any number of sensors can be used to measure ambient temperature. Using the ambient temperature as a trigger for the pump's pumping action may be less accurate than using the fluid's temperature as a trigger for the pump's pumping action since the fluid 104 can be warmer inside the hose 100 and/or the nozzle 102 than the ambient temperature, but the ambient temperature can nevertheless provide a reliable indication of when it would be prudent to heat the fluid 104 to help avoid freezing of the fluid 104. In an exemplary embodiment, an ambient temperature of 5° C. can be used as the predetermined threshold temperature when the fluid includes DEF. In some embodiments, the ambient temperature can be measured using a sensor positioned at the fluid exit opening 110 of the nozzle 102 where the fluid 104 can be most closely exposed to weather such that using that measured temperature in controlling heating can help ensure that the fluid 104 does not freeze at the fluid exit opening 110 or elsewhere in the nozzle 102 or hose 100. In some embodiments, the ambient temperature can be measured using a sensor attached to a housing (not shown) of the fuel dispensing device, either on an exterior surface thereof where the sensor is directly exposed to weather or within the housing where the sensor is not directly exposed to weather. In some embodiments, the ambient temperature can be measured using a sensor attached to a nozzle boot (not shown) that seats the nozzle 102 when not in use. In some embodiments, ambient temperature sensors can be located in multiple locations, and the lowest measured temperature from any of the sensors can be used to control heating, thereby helping to ensure that fluid 104 is adequately protected from freezing regardless of its location within the hose 100 or the nozzle 102.

In some embodiments, both fluid temperature and ambient temperature can be used to control the pump 136 such that if at least one of a predetermined fluid temperature and a predetermined ambient temperature is exceeded, the pump 136 can begin pumping the air 106.

The pump 136 can include an on-board controller 140, e.g., a microprocessor, a central processing unit (CPU), etc., configured to control the pump 136 based on the measured temperature. The controller 140 can be in communication with the sensor(s) configured to measure temperature and control the pump 136 based on measurements received from the sensor(s), e.g., turn the pump 136 on or off in accordance with the sensed temperatures. The pump 136 can include other electronic components configured to facilitate the controller's data processing, such as a memory, a printed circuit board, etc. In some embodiments, the controller can be located remotely from the pump 136 and can be in wired or wireless electronic communication therewith.

In some embodiments, the air 106 that enters the intake opening 132 can be heated. For example, the air entering the intake opening 132 can come from a supply of heated air.

Figure 3:
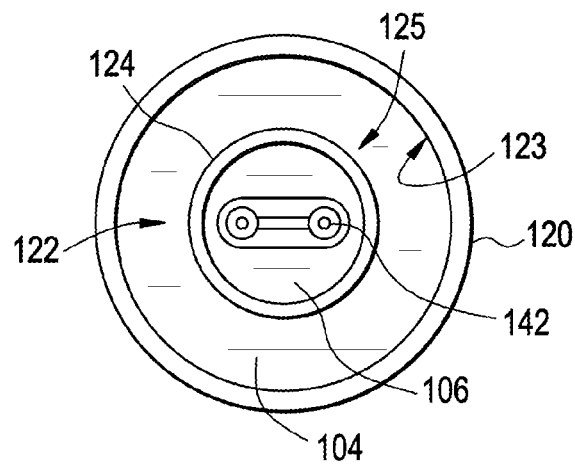
FIG. 3 is a cross-sectional view of the hose of FIG. 2.
Figure 4:
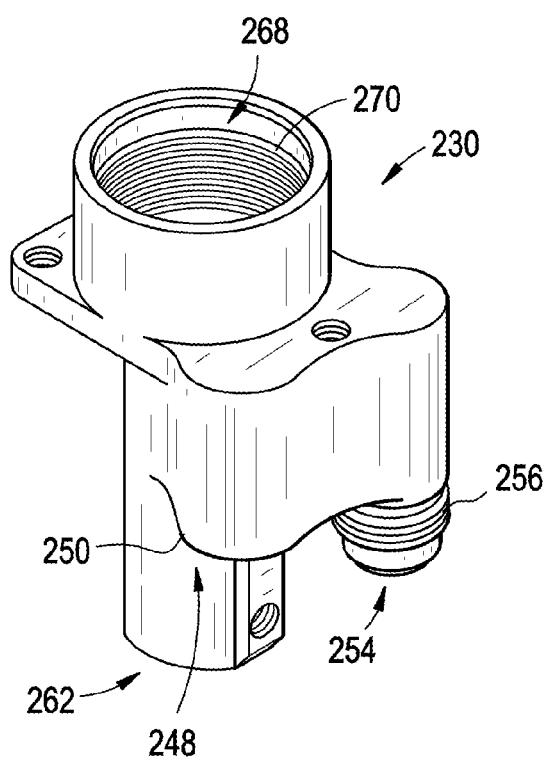
FIG. 4 is a perspective view of another embodiment of a manifold of a fuel dispensing device.
Figure 5:
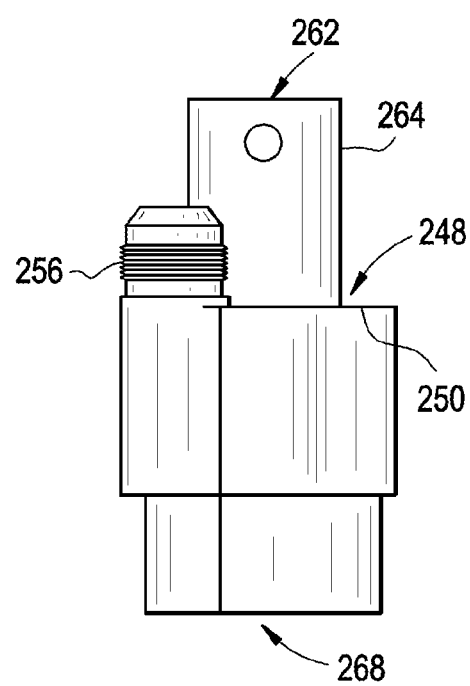
FIG. 5 is a side schematic view of another embodiment of a manifold of a fuel dispensing device.
Figure 10:
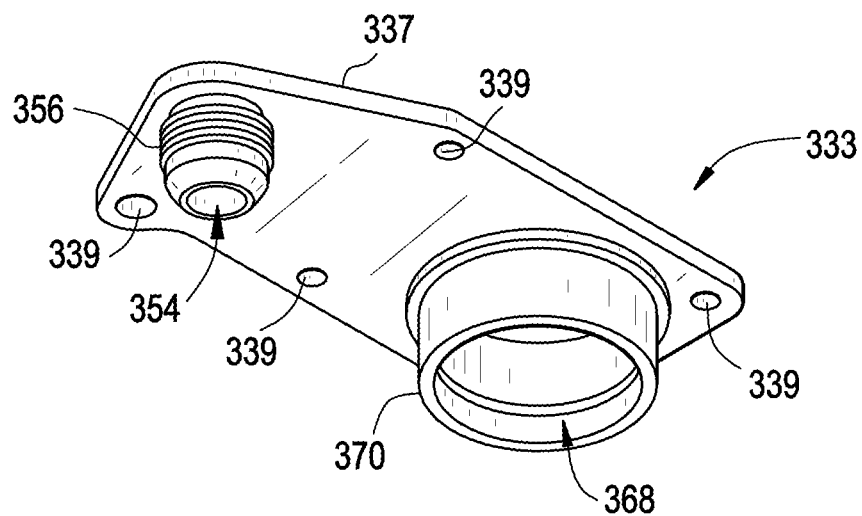
FIG. 10 is a perspective schematic view of a bottom portion of the manifold of FIG. 9.
Figure 11:
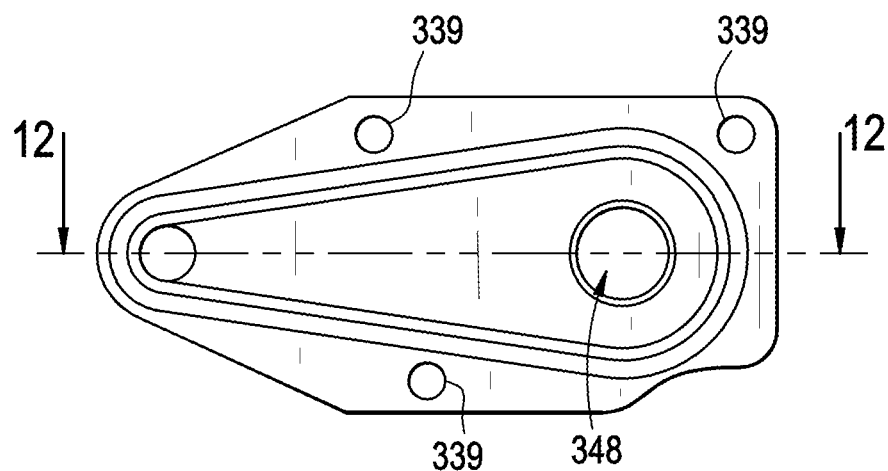
FIG. 11 is a bottom schematic view of the top portion of FIG. 9.
Figure 12:
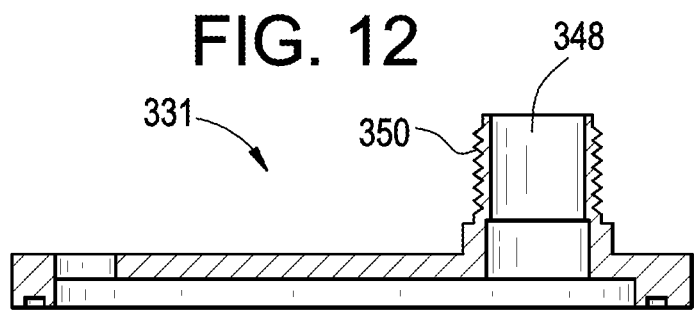
FIG. 12 is a side schematic cross-sectional view of the top portion of FIG. 11.
Figure 13:
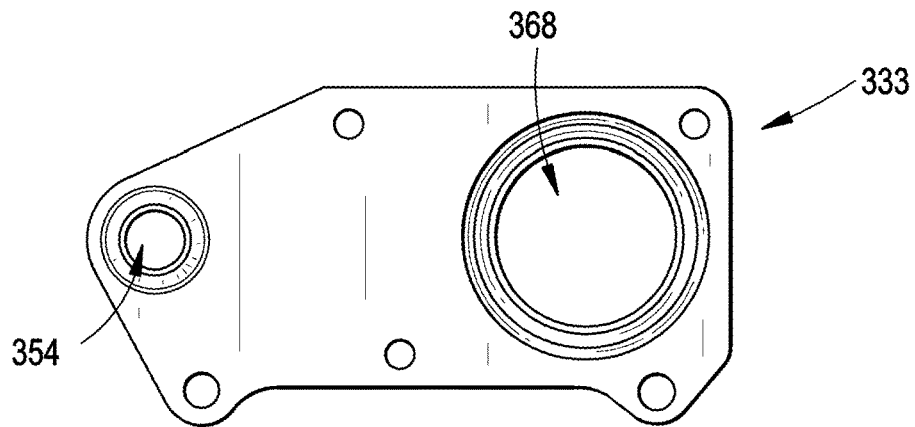
FIG. 13 is a bottom schematic view of the bottom portion of FIG. 10.
Figure 14:
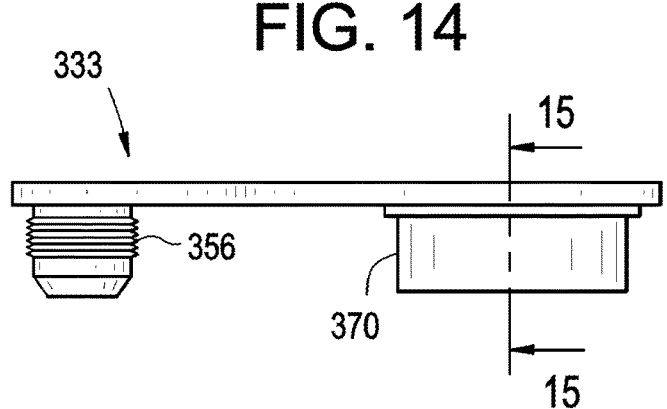
FIG. 14 is a side schematic view of the bottom portion of FIG. 10.
Figure 15:
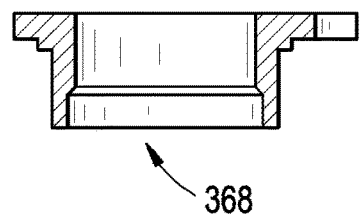
FIG. 15 is a side schematic cross-sectional view of a portion of the bottom portion of FIG. 14.

Alternatively, the air 106 that enters the intake opening 132 can be unheated, e.g., be ambient air. This can provide more flexibility to the system than providing heated air. In some embodiments, the intake opening 132 can have a heating element disposed therein configured to heat the air 106 as the air 106 passes therethrough. The air 106 can, however, lose heat as it travels from the intake opening 132 to the hose 100 and then to the nozzle 102. In some embodiments, as in this illustrated embodiment, as shown in FIGS. 1-3, the air passageway 124 can have a heating element 142 disposed therein. The heating element 142 can be configured to heat the air 106 as it passes thereby through the air tube 124. The heating element 142 is closer to the hose 100 and the nozzle 102 than a heating element disposed at the intake opening 132, which can more efficiently heat the air 106 and/or can more likely prevent freezing of the fluid 104 within the hose 100 and the nozzle 102. In some embodiments, a heating element can be provided at the intake opening 132 and another heating element can be provided within the air tube 124.

The heating element 142 can have a variety of sizes, shapes, and configurations. In some embodiments, the heating element 142 can include a positive temperature coefficient (PTC) heater configured to be self-regulating such that the colder the temperature (e.g., the colder the sensed ambient and/or fluid temperature), the more heat provided by the PTC heater. As in this illustrated embodiment, the heating element 142 can include a heat cable. Various heat cables can be used, as will be appreciated by a person skilled in the art, such as a Class I, Division 1 Underwriters Laboratories (UL) approved heater cable and such as a heat cable appropriate for usage in a hazardous area (e.g., a petrol station, etc.) and complying with European standard EN-13617.

The heating element 142 can be disposed within the hose 100, as shown in FIGS. 1 and 2, which can efficiently prevent the fluid 104 within the hose 100 from freezing with a relatively low amount of heating power, e.g., about 20 W per foot. The heating element 142 can extend through substantially an entire longitudinal length of the hose 100, as also shown in FIGS. 1 and 2, with a distal terminal end of the heating element 142 being located just proximal of the swivel 114 and hence located proximal of the nozzle 102. The hose 100 can be relatively long, e.g., in a range of about 10 to 12 feet, so having the heating element 142 disposed within a substantial longitudinal length of the hose 100 can help reduce the effects of thermodynamic loss, e.g., as opposed to a heating element located at one end of the hose 100 or a heating element not disposed within the hose 100 at all, and can help ensure that heat is provided to the fluid 104 in the nozzle 102 since the heat need not travel far from the heating element 142 to reach the fluid 104 in the nozzle 102.

The heating element 142 can, as shown in FIG. 2, be coupled to a power supply and control 144 configured to provide power, e.g., via battery, via electric power outlet, etc., to the heating element 142 via a heating element control cable 146 extending between the power supply and control 144 and the heating element 142. The power supply and control 144 can be configured to continuously heat the heating element 142. Continuously heating the heating element 142 can help ensure that the fluid 104 in the hose 100 and/or the nozzle 102 does not freeze, but this continuous heating can be expensive and/or increase risk of wearing out and/or otherwise damaging the heating element 142 and/or the power supply and control 144. In especially cold climates, however, continuously running the heating element 142 can be desirable. Alternatively, the power supply and control 144 can be configured to non-continuously, e.g., intermittently, heat the heating element 142. Non-continuously heating the heating element 142 can help reduce wear and tear on the heating element 142 and/or the power supply and control 144 and/or can help prevent the heating element 142 from providing heat when the fluid 104 is not at a temperature at which it may freeze or begin to freeze. The heating element 142 can be coupled to a housing (not shown) of the fuel dispensing device and can be located entirely inside the housing, entirely outside the housing, or partially inside and partially outside the housing. Similarly, the power supply and control 144 can be coupled to a housing (not shown) of the fuel dispensing device and can be located entirely inside the housing, entirely outside the housing, or partially inside and partially outside the housing. Locating the heating element 142 and/or the power supply and control 144 at least partially outside the housing can facilitate repair and/or upgrade of broken or outdated parts without requiring opening of the housing at all and/or opening of the housing in an easier way than if the part being repaired and/or upgraded is entirely within the housing.

The heating element 142 can be configured to provide heat 106 based on a measured temperature. Similar to that discussed above regarding the pump 136, if the measured temperature is above a predetermined threshold temperature, then the heating element 142 can be configured to not provide heat, e.g., the power supply and control 144 can be configured to not provide power to the heating element 142, and if the measured temperature is below the predetermined threshold temperature, then the heating element 142 can be configured to provide heat, e.g., the power supply and control 144 can be configured to provide power to the heating element 142. Also similar to that discussed above regarding the pump 136, the power supply and control 144 can include an on-board controller, as in this illustrated embodiment, or the controller can be located remotely from the power supply and can be in wired or wireless electronic communication therewith. The power supply and control 144 can include other electronic components configured to facilitate the controller's data processing, such as a memory, a printed circuit board, etc.

The movable element 114 can have a variety of sizes, shapes, and configurations. In an exemplary embodiment, the movable element 114 can be configured to rotate or "swivel" relative to the hose 100 about a longitudinal axis of the hose 100, which can allow the nozzle 102 to be desirably positioned relative thereto and accordingly improve usability of the fuel dispensing device.

The movable element 114 can be configured to break away from the hose 100 so as to allow the nozzle 102 to be detached from the hose 100 in response to an amount of force applied thereto. This can be a safety feature. For example, if a user accidentally drives away with the nozzle 102 still attached to their vehicle, the movable element 114, with the nozzle 102 attached thereto, can be break away from the hose 100, thereby avoiding potentially very serious damage caused by the hose 100 and/or the fuel dispensing device being pulled away due to the force of the moving vehicle.

The movable element 114 can include an adapter portion 117 and a breakaway portion 115 configured to facilitate the breaking away of the movable element 114, and the nozzle attached thereto 102, from the hose 100. The adapter portion 117 can be proximal to the breakaway portion 115 and can be configured to remain attached to the hose 100 in the event that the breakaway portion 115 is actuated in response to atypical force being applied to the nozzle 102 and/or the hose 100. The adapter portion 117 of the movable element 114 can be configured to be in a fixed position relative to the hose 100 so as to remain stationary thereto, with the breakaway portion 115 of the movable element 114 being configured to swivel as discussed herein.

The breakaway portion 115 can be configured to be self-sealing. The breakaway portion 115 can be configured automatically seal so as to close newly exposed open ends of the fuel passageway 122 and the air passageway 124 when the breakaway portion 115 "breaks." In this way, the breakaway portion 115 can be configured to prevent the fuel 104 from leaking out of the fuel passageway 122 and to prevent the air 106 from leaving out of the air passageway 124 in the event that the movable element 114, and the nozzle 102 attached thereto, are separated from the hose 100. The breakaway portion 115 can be located outside of the nozzle 102, e.g., entirely proximal to the nozzle 102, as in this illustrated embodiment, which can allow for improved flexibility in nozzle designs and/or for easier manufacturing of nozzles. The breakaway portion 115 can be located entirely distal to the heating element 142, which can help prevent damage to the heating element 142 in the event that the breakaway portion 115 is activated when the nozzle 102 is separated from the hose 110. The breakaway portion 115 can be configured to self-seal in a variety of ways. As in this illustrated embodiment, the breakaway portion 115 can include one or more sealing elements 121 configured to pinch together upon the breaking, thereby sealing the fuel passageway 122 and the air passageway 124.

The movable element 114 can include a break region 119 configured to facilitate the breaking away of the breakaway portion 115 from the adapter portion 117 and from the hose 100. The break region 119 can include scoring that extends circumferentially around the movable element 114, as in this illustrated embodiment, although the break region 119 can have other configurations, e.g., a weakened area of thinner and/or different material than a remainder of the movable element's sidewall.

The manifold 130 can have a variety of sizes, shapes, and configurations. The manifold 130, shown in FIG. 2, can be configured to facilitate passage of the fluid 104 from the fluid supply 126 into the hose 100 and passage of the air 106 from the air supply into the hose 100 without the fluid 104 mixing with the air 106. The manifold 130 can include a first opening 148 through which the air 106 can flow from the air supply, e.g., into which the pump 136 can pump the air 106. Adjacent the first opening 148 can be a first coupling element 150 configured to mate with the air supply, e.g., with a tube 152 through which the air 106 flows from the pump 136. The first coupling element 150 in this illustrated embodiment includes a tube into which the tube 152 can mate by, e.g., interference fit.

The manifold 130 can include a second opening 154 through which the fluid 104 can flow from the fluid supply 126. Adjacent the second opening 154 can be a second coupling element 156 configured to mate with the fluid supply 126, e.g., with a tube 158 through which the fluid 104 flows. The second coupling element 156 in this illustrated embodiment includes a thread configured to threadably mate with a threaded member 160 at an end of the tube 158. The first and second openings 148, 154 can not be in fluid communication, which can help prevent the fluid 104 passing through the second opening 154 from mixing with the air 106 passing through the first opening 148.

The manifold 130 can include a third opening 162 into which the control cable 146 can extend. Adjacent the third opening 162 can be a third coupling element 164 configured to mate with the control cable 146, e.g., with a coupling element 166 at an end of the control cable 146. The third coupling element 164 in this illustrated embodiment includes a tube into which the coupling element 166 can mate by, e.g., interference fit. The third opening 162 can be in communication with the first opening 148, which can allow the heating element 142 and the air 106 to be in contact with one another. The third opening 162 can thus not be in communication with the second opening 154, similar to the first opening 148.

The manifold 130 can include a fourth opening 168 through which the air 106 can flow after entering the manifold 130 through the first opening, through which the fluid 104 can flow after entering the manifold through the second opening 154, and through which the heating element 142 extending from the coupling element 166 at the third opening 162 can extend. Adjacent the fourth opening 168 can be a fourth coupling element 170 configured to mate with the hose 100, e.g., with a proximal end thereof that is opposite to a distal end thereof configured to mate to the nozzle 102. The fourth coupling element 170 in this illustrated embodiment includes a thread configured to threadably mate with a thread 172 at the proximal end of the hose 100.

FIG. 4-8 illustrates another embodiment of a manifold 230. The manifold 230 in this illustrated embodiment includes a first opening 248 through which air can flow, a first coupling element 250 configured to mate with an air supply, a second opening 254 through which fluid can flow, a second coupling element 256 configured to mate with a fluid supply, a third opening 262 through which a heating element control cable can extend, a third coupling element 264 configured to mate with the control cable, a fourth opening 268 through which the air and the fluid can flow and through which the heating element can extend, and a fourth coupling element 270 configured to mate with a hose. In this illustrated embodiment, the first coupling element 250 includes a tube, the second coupling element 256 includes a thread, the third coupling element 264 includes a thread, and the fourth coupling element 266 includes a thread. Like the manifold 130 of FIG. 2, the manifold 230 in this illustrated embodiment is a unitary piece, e.g., a singular element.

FIGS. 9-15 illustrate another embodiment of a manifold (not shown assembled) that includes a first, upper portion 331 and a second, lower portion 333. A first base 335 of the first portion 331 can be configured to face and mate with a second base 337 of the second portion 333 to form the manifold. In an exemplary embodiment, flat surfaces of first and second bases 335, 337 can face one another and be mated together via a plurality of screws inserted through mating holes 339 formed in each of the first and second portions 331, 333, although the first and second portions 331, 333 can be mated together in any combination of one or more ways, e.g., screws, adhesive, welding, etc. A sealing element, e.g., an o-ring, can be disposed therebetween to provide fluid sealing between the first and second portions 331, 333.

The manifold in this illustrated embodiment includes a first opening 348 through which air can flow, a first coupling element 350 configured to mate with an air supply, a second opening 354 through which fluid can flow, a second coupling element 356 configured to mate with a fluid supply, a fourth opening 368 through which the air and the fluid can flow and through which a heating element can extend, and a fourth coupling element 370 configured to mate with a hose. In this illustrated embodiment, the first opening 348 can be configured to also have the heating element control cable extend therethrough. In this illustrated embodiment, the first coupling element 350 includes a thread, the second coupling element 356 includes a thread, and the fourth coupling element 366 includes a tube. The manifold in this illustrated embodiment is a non-unitary, multi-piece member.

FIGS. 16-20 illustrate another embodiment of a fuel dispensing device 401 configured to heat fluid (not shown) that can be dispensed therefrom. The device 401 can include a hose 400, a nozzle 402, a heating element (not shown), a movable element 414, and a manifold 430. The hose 400 can be configured as a coaxial hose and include at least two coaxial tubes, e.g., an outer tube 420 and an inner tube (not shown). The nozzle 402 can include a dispensing trigger 408, a fluid exit opening 410, and an air exit opening 412. Like the nozzle 102 of FIG. 1, the nozzle 402 of FIGS. 16-18 can have the fluid exit opening 410 located distal to the air exit opening 412. This relative positioning can allow the heated air to pass through the air exit opening 412 at any time regardless of whether or not the nozzle 402 is seated in a nozzle boot 403 and regardless of whether or not the fluid is passing through the fluid exit opening 410.

The device 401 can include a housing 405 configured to be securely mounted to the ground and/or other stable area. The housing 405 can have the nozzle boot 403 formed therein. The housing 405 can have a second nozzle boot 407 formed therein configured to seat a second nozzle (not shown) similar to the nozzle 402 that can be coupled to a hose (not shown) similar to the hose 400, which can be coupled to a manifold (not shown) similar to the manifold 430.

Figure 16:
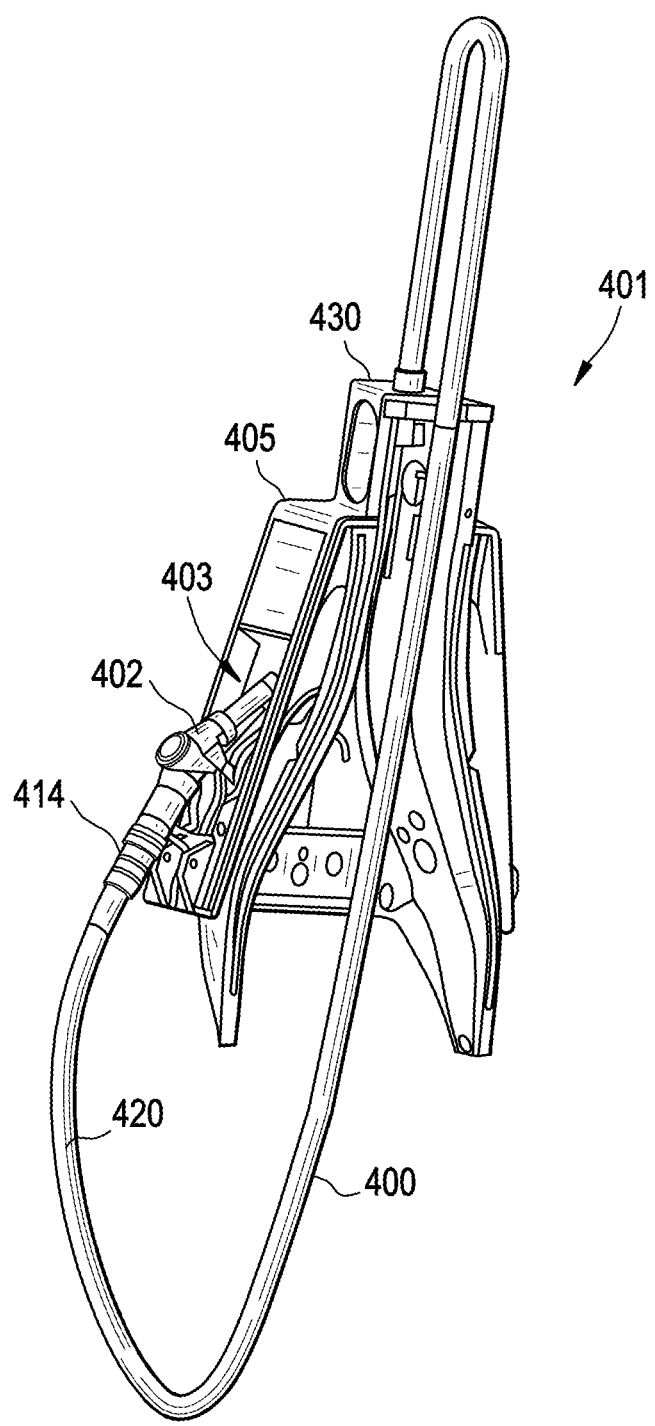
FIG. 16 is a perspective schematic view of an embodiment of a fuel dispensing device including a hose and a nozzle.
Figure 17:
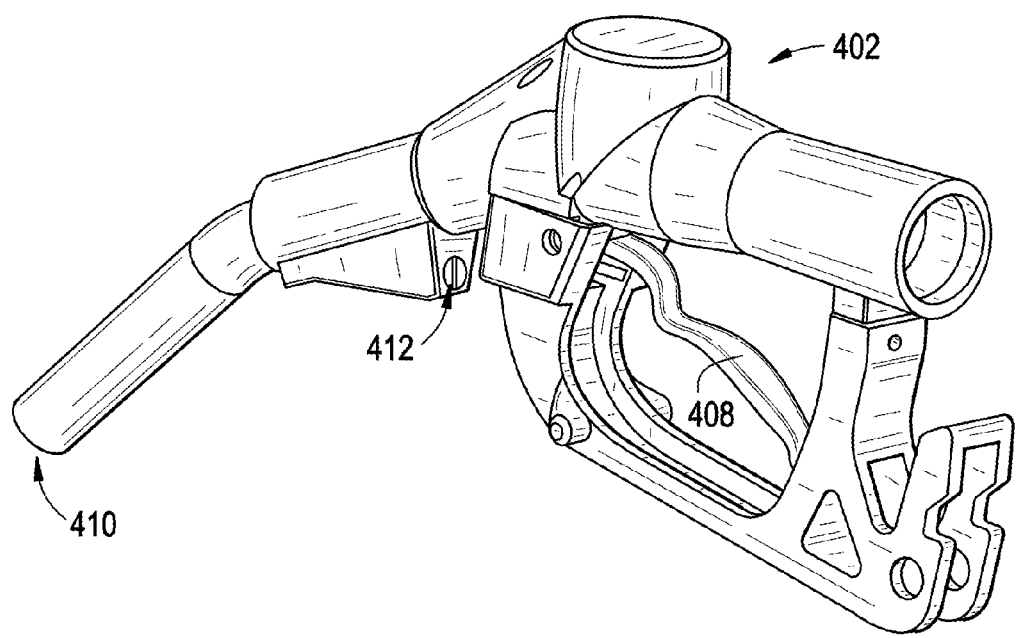
FIG. 17 is a perspective view of the nozzle of FIG. 16.
Figure 18:
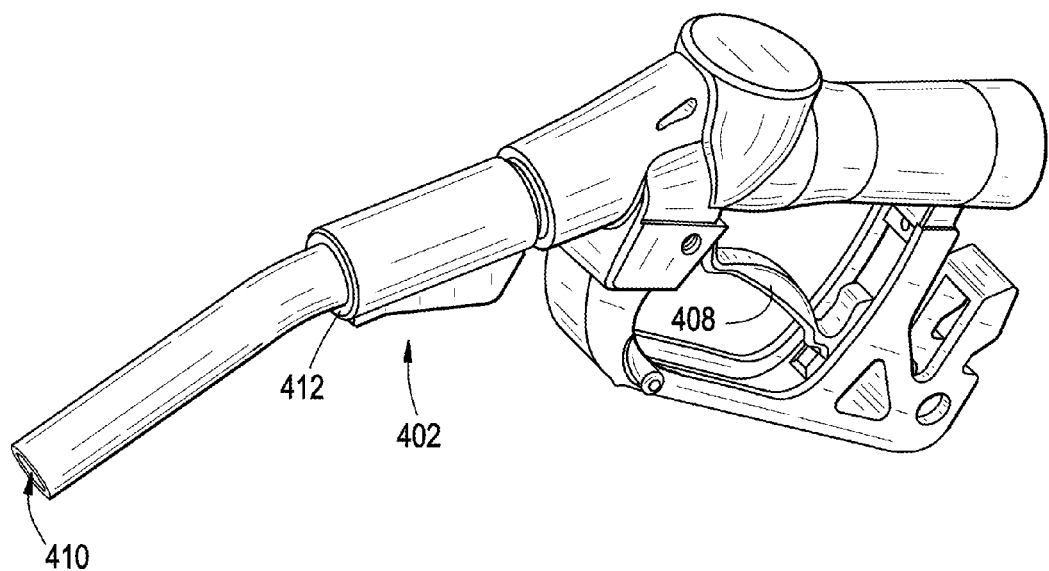
FIG. 18 is a perspective schematic view of the nozzle of FIG. 16.
Figure 19:
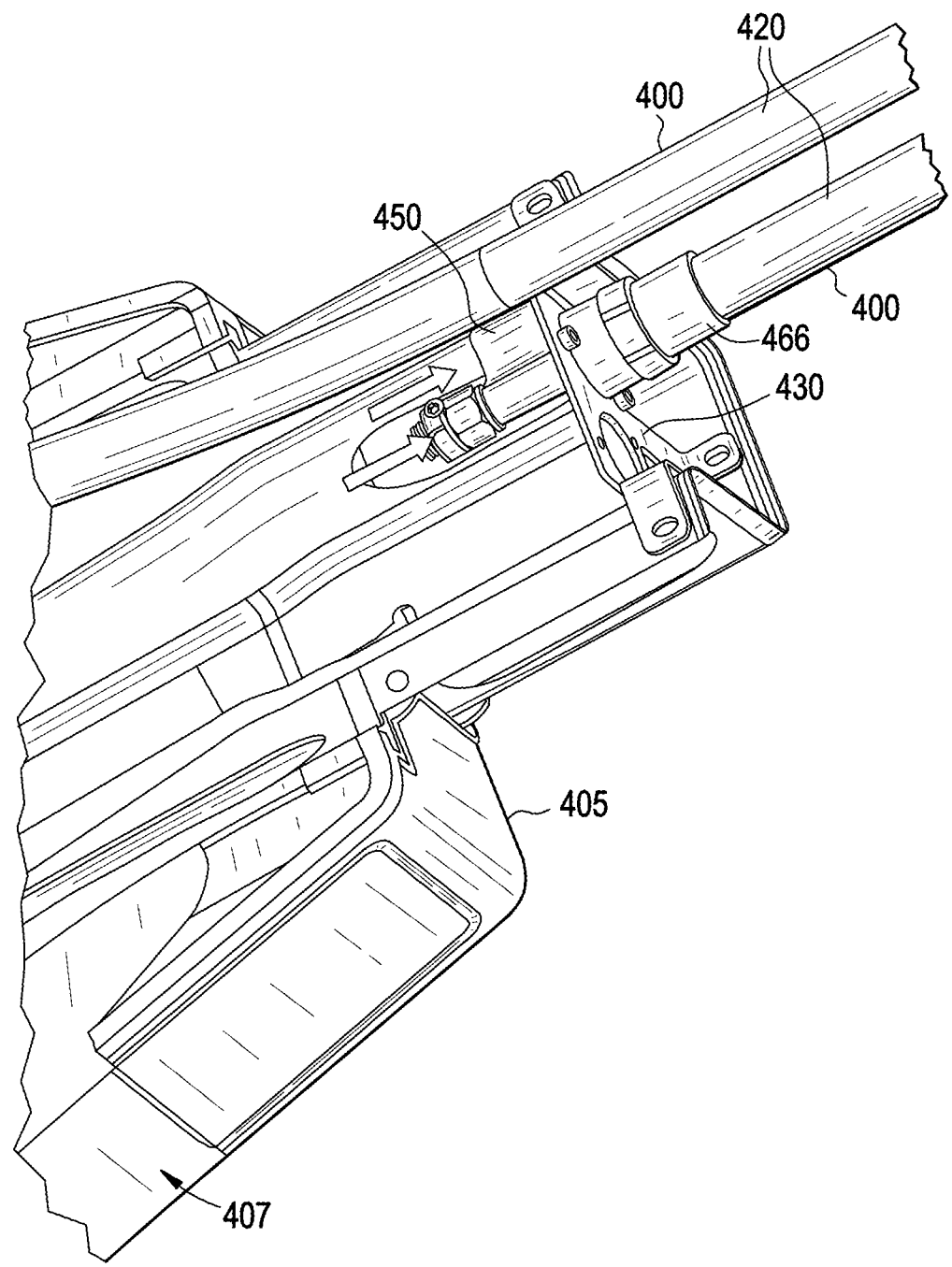
FIG. 19 is a perspective schematic view of a portion of the fuel dispensing device of FIG. 16 including a manifold.
Figure 20:
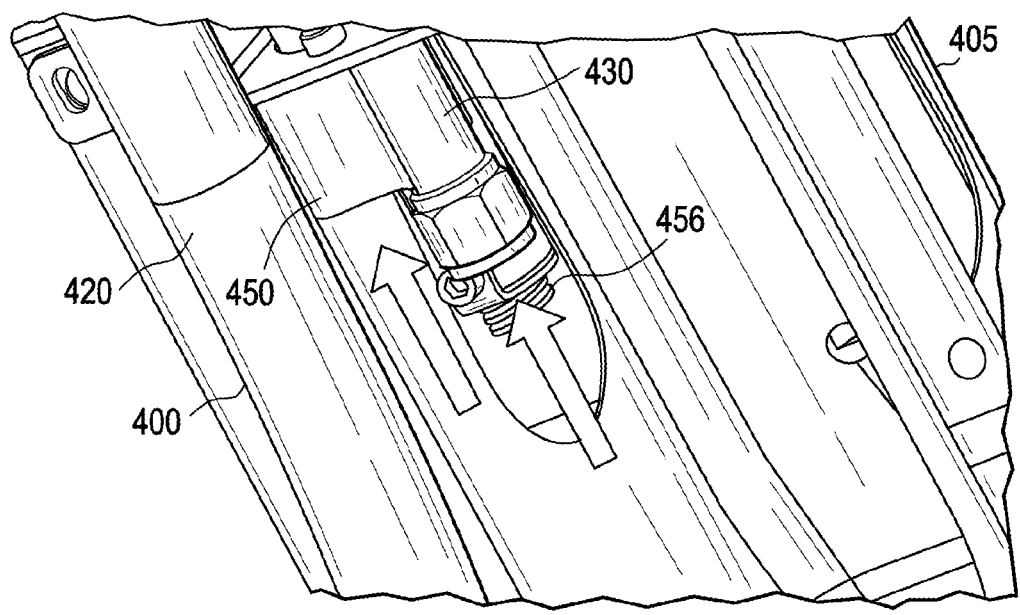
FIG. 20 is another perspective schematic view of the portion of FIG. 19.

The manifold 430 in this illustrated embodiment is a unitary member, as shown in FIGS. 16, 19, and 20. The manifold 430 can be fixedly mounted to the housing 405, as in this illustrated embodiment. The manifold 430 is disposed within the housing 405 in this illustrated embodiment, but a manifold can be fully or partially located outside a housing. Locating the manifold at least partially outside the housing can facilitate repair and/or upgrade of broken or outdated parts without requiring opening of the housing at all and/or opening of the housing in an easier way than if the part being repaired and/or upgraded is entirely within the housing. The manifold 430 can include a first opening through which air can flow, a first coupling element 450 configured to mate with an air supply, a second opening through which fluid can flow, a second coupling element 456 configured to mate with a fluid supply, a fourth opening through which the air and the fluid can flow and through which a heating element can extend, and a fourth coupling element 466 configured to mate with the hose 400. In this illustrated embodiment, the first opening can be configured to also have a heating element control cable extend therethrough. In this illustrated embodiment, the first coupling element 450 includes a tube, the second coupling element 456 includes a thread, and the fourth coupling element 466 includes a thread.

Figure 21:
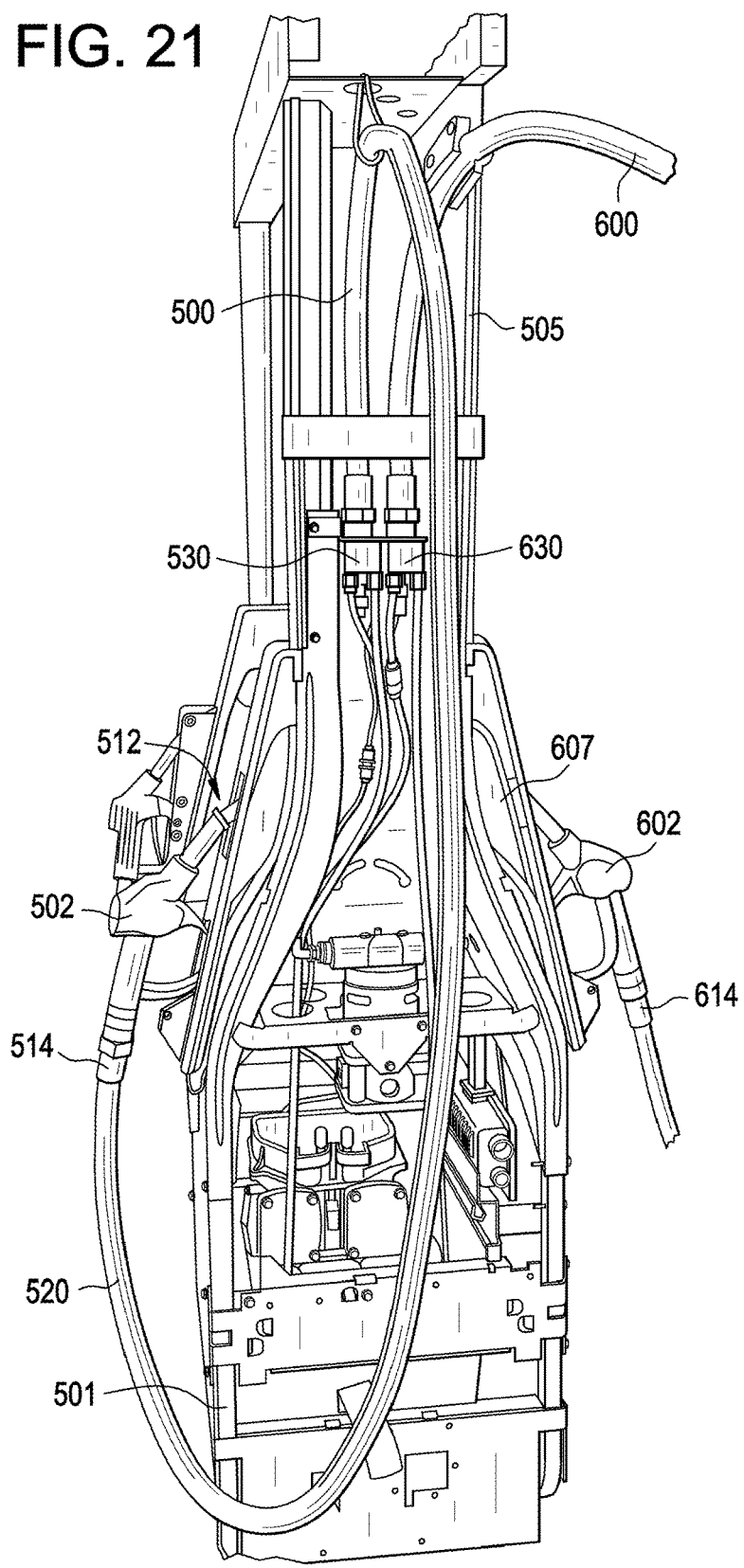
FIG. 21 is a perspective view of another embodiment of a fuel dispensing device including a hose and a nozzle.
Figure 22:
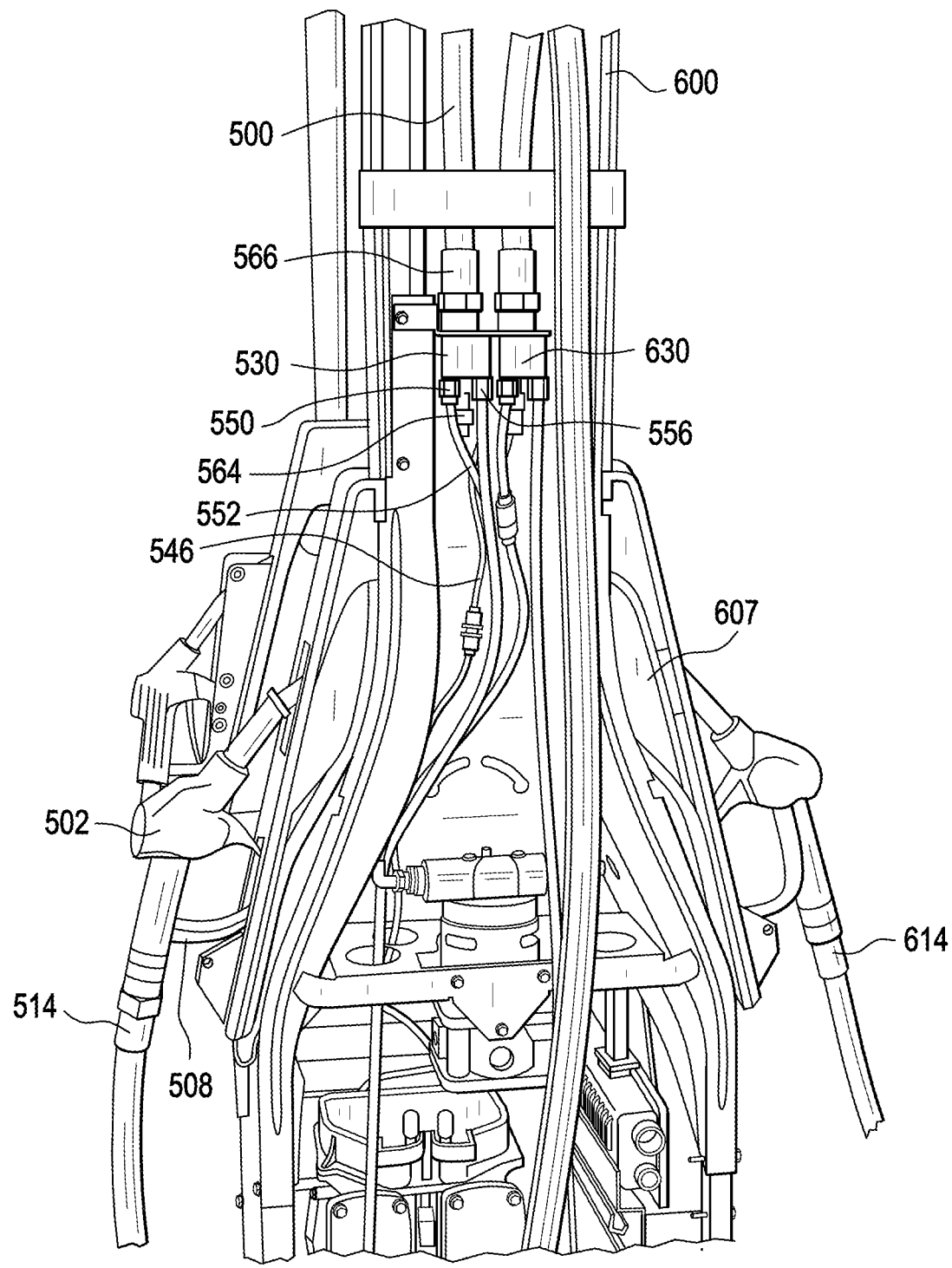
FIG. 22 is a perspective view of a portion of the fuel dispensing device of FIG. 21 including a manifold.
Figure 23:
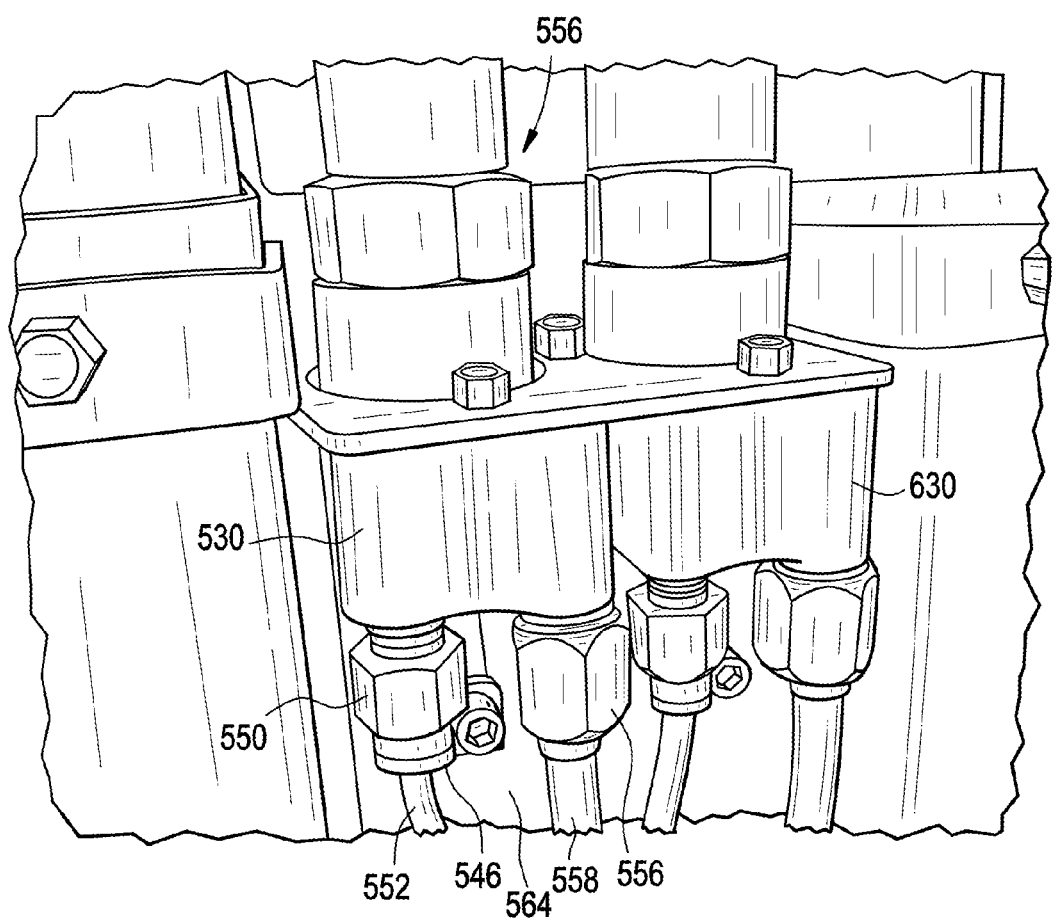
FIG. 23 is another perspective view of a portion of the fuel dispensing device of FIG. 21 including a manifold.

FIGS. 21-23 illustrate another embodiment of a fuel dispensing device 501 configured to heat fluid (not shown) that can be dispensed therefrom. The device 501 can include a housing 505, a hose 500, a nozzle 502, a nozzle boot 503, a heating element (not shown), a movable element 514, and a manifold 530. The hose 500 can be configured as a coaxial hose and include at least two coaxial tubes, e.g., an outer tube 520 and an inner tube (not shown). The nozzle 502 can include a dispensing trigger 508, a fluid exit opening (not shown), and an air exit opening 512. Like the nozzle 102 of FIG. 1, the nozzle 502 of FIGS. 21 and 22 can have the fluid exit opening located distal to the air exit opening 512.

Similar to the manifold 430 of FIGS. 16, 19, and 20, the manifold 530 of FIGS. 21-23 is a unitary member and is fixed to the housing 501. The manifold 530 can include a first opening through which air can flow, a first coupling element 550 configured to mate with an air supply, a second opening through which fluid can flow, a second coupling element 556 configured to mate with a fluid supply, a third opening through which a heating element control cable 546 can extend, a third coupling element 564 configured to mate with the control cable 546, a fourth opening through which the air and the fluid can flow and through which a heating element can extend, and a fourth coupling element 566 configured to mate with the hose 500. In this illustrated embodiment, the first, second, third, and fourth coupling elements 550, 556, 564, 566 each include a thread. FIGS. 21-23 also show a tube 558 mated to the second coupling element 556 and through which the fluid flows, and show a tube 552 mated to the first coupling element 550 and through which the air flows.

The device 501 in this illustrated embodiment also includes a second hose 600, a second nozzle 602, a second nozzle boot 607, a second heating element (not shown), a second movable element 614, and a second manifold 630 similar to the hose 500, the nozzle 502, the nozzle boot 503, the heating element (not shown for the hose 500 and nozzle 502 in this illustrated embodiment), the movable element 514, and the manifold 530.

Figure 24:
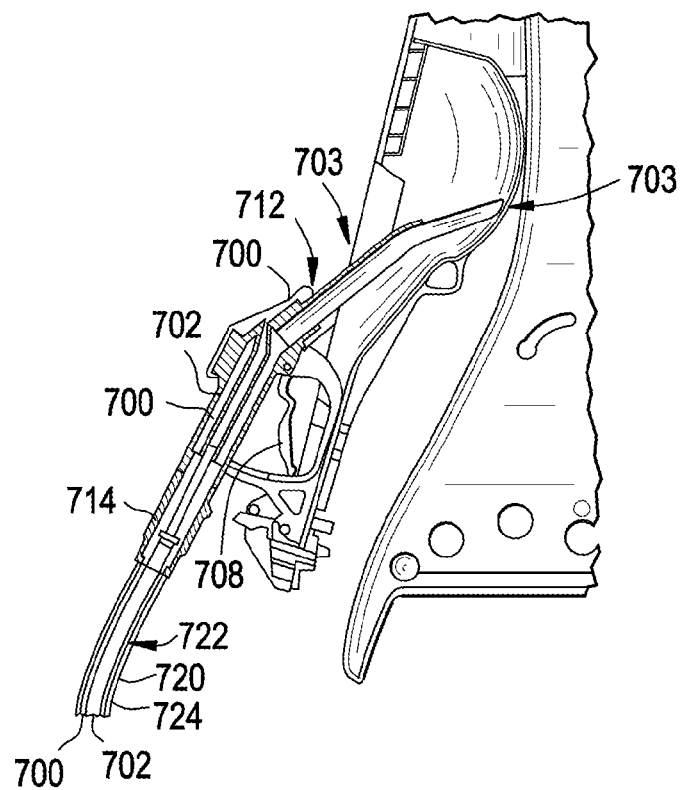
FIG. 24 is a side partially cross-sectional view of a hose and a nozzle of a fuel dispensing device.
Figure 25:
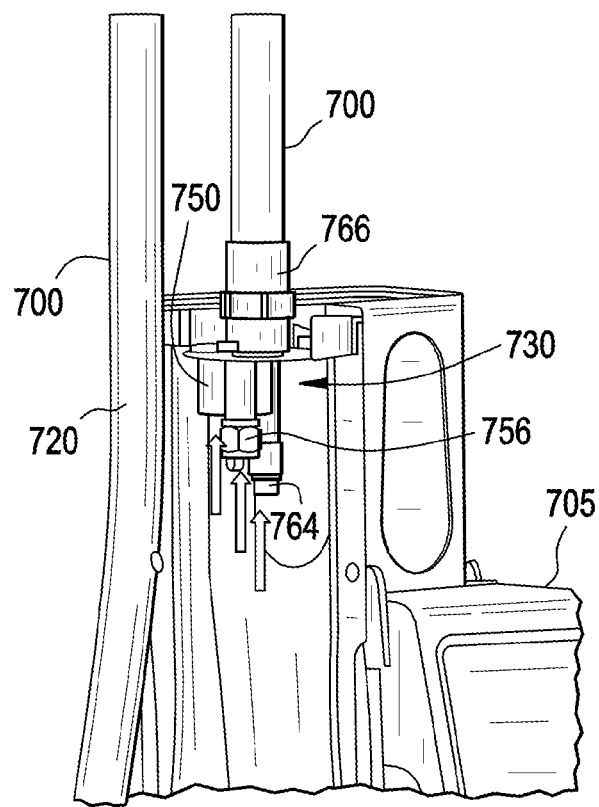
FIG. 25 is a perspective view of another portion of the fuel dispensing device of FIG. 24.

FIGS. 24 and 25 illustrate another embodiment of a fuel dispensing device configured to heat fluid 700 that can be dispensed therefrom. The device can include a housing 705, a hose 700, a nozzle 702, a nozzle boot 703, a heating element (not shown), a movable element 714, and a manifold 730. The hose 700 can be configured as a coaxial hose and include at least two coaxial tubes, e.g., an outer tube 720, a fluid passageway 722, and an air tube 724. The nozzle 702 can include a dispensing trigger 708, a fluid exit opening (not shown), and an air exit opening 712. Like the nozzle 102 of FIG. 1, the nozzle 702 of FIG. 24 can have a fluid exit opening 710 located distal to an air exit opening 712.

Similar to the manifold 430 of FIGS. 16, 19, and 20, the manifold 730 of FIG. 25 is a unitary member and is fixed to the housing 701. The manifold 730 can include a first opening through which air can flow, a first coupling element 750 configured to mate with an air supply, a second opening through which fluid can flow, a second coupling element 756 configured to mate with a fluid supply, a third opening through which a heating element control cable (not shown) can extend, a third coupling element 764 configured to mate with the control cable, a fourth opening through which the air and the fluid can flow and through which the heating element can extend, and a fourth coupling element 766 configured to mate with the hose 700. In this illustrated embodiment, the first, second, third, and fourth coupling elements 750, 756, 764, 766 each include a thread.

Figure 26:
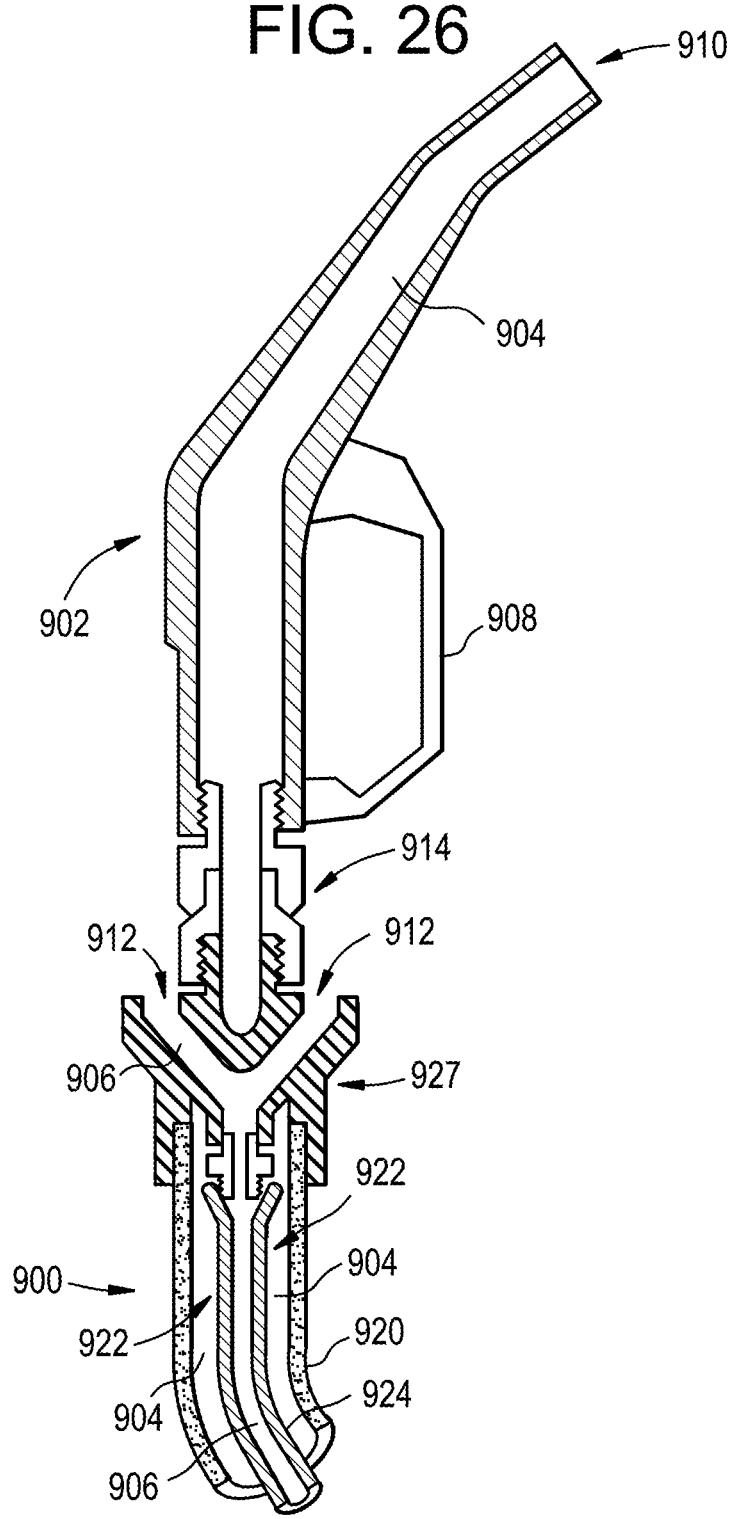
FIG. 26 is a side schematic cross-sectional view of another embodiment of a fuel dispensing device.

FIG. 26 illustrates another embodiment of a fuel dispensing device configured to heat fluid 904 that can be dispensed therefrom. The device can include a hose 900, a nozzle 902, a heating element (not shown), an air exit opening 912, a movable element 914, and a manifold (not shown). The hose 900 can be configured as a coaxial hose and include at least two coaxial tubes, e.g., an outer tube 920 and an inner tube 924. The nozzle 902 can include a dispensing trigger 908, and a fluid exit opening 910. The nozzle 902 of FIG. 26 can have the fluid exit opening 910 located distal to the air exit opening 912. The air exit opening 912 can be from the hose 900 such that air 906 exiting the air exit opening 912 does not enter the nozzle 902. Instead, the exiting air 906 can flow outside of the nozzle 902 so as to facilitate heating of the nozzle 902 from an exterior thereof. In other words, the air passageway through which the air 906 flows can be located within the hose 900 but not within the nozzle 902. The hose 900 can thus be configured to be used with existing nozzles such that the nozzles need not be retrofitted for heating using the coaxial heating system disclosed herein.

The fuel dispensing device can include an air diverter 927 configured to facilitate flow of the fluid 904 into the nozzle 902 without mixing the air 906 with the fluid 904 and while allowing the air 906 to exit from the air exit opening 912. In other words, the air diverter 927 can be configured to divert the air 906 within the hose 900, e.g., within the inner tube 924, to an area outside the nozzle 902 while allowing the fluid 904 within the hose 900, e.g., within a gap of space 922 between the inner and outer tubes 920, 924, to flow into the nozzle 902. As in the illustrated embodiment, the air diverter 927 can be located proximal to the movable element 914, which can facilitate retrofitting to existing nozzles and/or can help maintain heated air flow around the nozzle 902 even during use of the nozzle 902 by a user.

In some embodiments, a fuel dispensing system can include a nozzle that includes an air intake opening instead of an air exit opening. The air intake opening can be similar to the air exit openings described herein except that instead of heated air passing through the nozzle in a distal direction and exiting the nozzle through the air exit opening, heated air can pass through the nozzle in a proximal direction and enter the nozzle through the air intake opening. The heated air that enters the nozzle through the air intake opening can pass into the hose from the nozzle, thereby allowing fuel to be heated within the hose as well as within the nozzle. The hose can include an air exit opening similar to the air exit openings described herein for nozzles, thereby allowing the heated air to exit the system. The hose's air exit opening can allow the air to be released directly into the atmosphere or to first be released into an element of the fuel dispensing system, such as a housing, before being released into the atmosphere.

The heated air can be provided to the nozzle for entry into the nozzle in a variety of ways. For example, an air supply similar to those described herein can be coupled to a nozzle boot configured to selectively seat the nozzle. The air supply can be configured to supply the air in a heated state into proximity of the nozzle, e.g., into a nozzle boot that seats the nozzle, into a shroud that covers the nozzle, etc. The heated air can then be allowed to enter the nozzle's air intake opening.

Because the air is heated prior to entering either the nozzle or the hose when the nozzle is configured to have the heated air enter therein, a heating element need not be disposed within either the nozzle or the hose. This can facilitate manufacturing of the nozzle and the hose.

In some embodiments, a nozzle including an air intake opening can also include an air exit opening. In such an embodiment, the hose need not include an air exit opening even though the heated air that enters the nozzle may also be able to enter the hose so as to heat fuel therein. The hose not including an air exit opening can make the system easier to manufacture and/or maintain since conventional hoses can be used and/or heated air can exit from an element (e.g., the nozzle) that can be already exposed to the outside environment by virtue of its accessibility in a nozzle boot.

In some embodiments, a fuel dispensing device can include an air containment mechanism configured to facilitate heating of the fuel dispensing device's nozzle using heated air that exits the nozzle, e.g., through an air exit opening thereof, or that enters the nozzle, e.g., through an air intake opening thereof. In an exemplary embodiment, the air containment mechanism can be configured to facilitate heating of the nozzle's spout, e.g., the nozzle's fluid exit opening, which as mentioned above can be more prone to fluid freezing due to its closer proximity to weather than other portions of the nozzle and hose. The air containment mechanism can be configured to help contain the heated air in proximity with the nozzle, e.g., the nozzle's spout, whether the heated air is released from the nozzle or is supplied in proximity of the nozzle for entry into the nozzle. The air containment mechanism can thus effectively use "waste" heated air to further help prevent the freezing of fluid.

The fuel dispensing device can include a sensor in proximity of the air containment mechanism, e.g., attached to the nozzle adjacent the air exit opening, attached to the nozzle boot, attached to the nozzle adjacent the air intake opening, etc., and configured to sense an ambient temperature. By using this sensor alone or in combination with other sensors configured to sense temperature, heating can be more efficiently controlled, e.g., turned on or off in response to temperature, so as to better help ensure that fluid does not freeze and that heat is provided when necessary and not provided when unnecessary.

The air containment mechanism can be configured to be a passive element that a user of the fuel dispensing device need not manipulate, e.g., remove, open, etc., in order to handle the nozzle and dispense fluid therefrom. The user's experience can thus be akin to the user's current dispensing expectations, which can help provide for a better user experience than at least some traditional heating techniques, such as a shroud that a user must move and/or remove prior to dispensing.

The air containment mechanism can be located at a portion of a fuel dispensing device's housing that seats the nozzle, e.g., a nozzle boot of the device. In this way, the fuel dispensing device can be configured to heat the nozzle when not in use, e.g., when fluid is not being dispensed therefrom, which can be when the fluid is more likely to freeze since it is not flowing and in motion.

The air containment mechanism can include a cavity open at a bottom thereof and closed upwards, similar to an awning. In an exemplary embodiment, the cavity can be located in the nozzle boot portion of the fuel dispensing device with the open bottom of the cavity being located in a direction toward the ground on which the fuel dispensing device is seated. The open bottom can be completely open, e.g., unobscured by any material, or the open bottom can be partially open, e.g., at least partially obscured by a material. For a semi-open bottom, the material at least partially obscuring the cavity can be a variety of materials, such as a type of broom material that can allow air to pass therethrough while also helping to insulate the cavity by helping to contain heated air within the cavity, or a type of screen material that can allow air to pass therethrough while also helping to insulate the cavity by helping to contain heated air within the cavity. If the bottom is semi-open, the material at least partially obscuring the bottom can be configured to be a passive element that a user of the fuel dispensing device need not manipulate, e.g., remove, open, etc., in order to handle the nozzle and dispense fluid therefrom.

Figure 27:
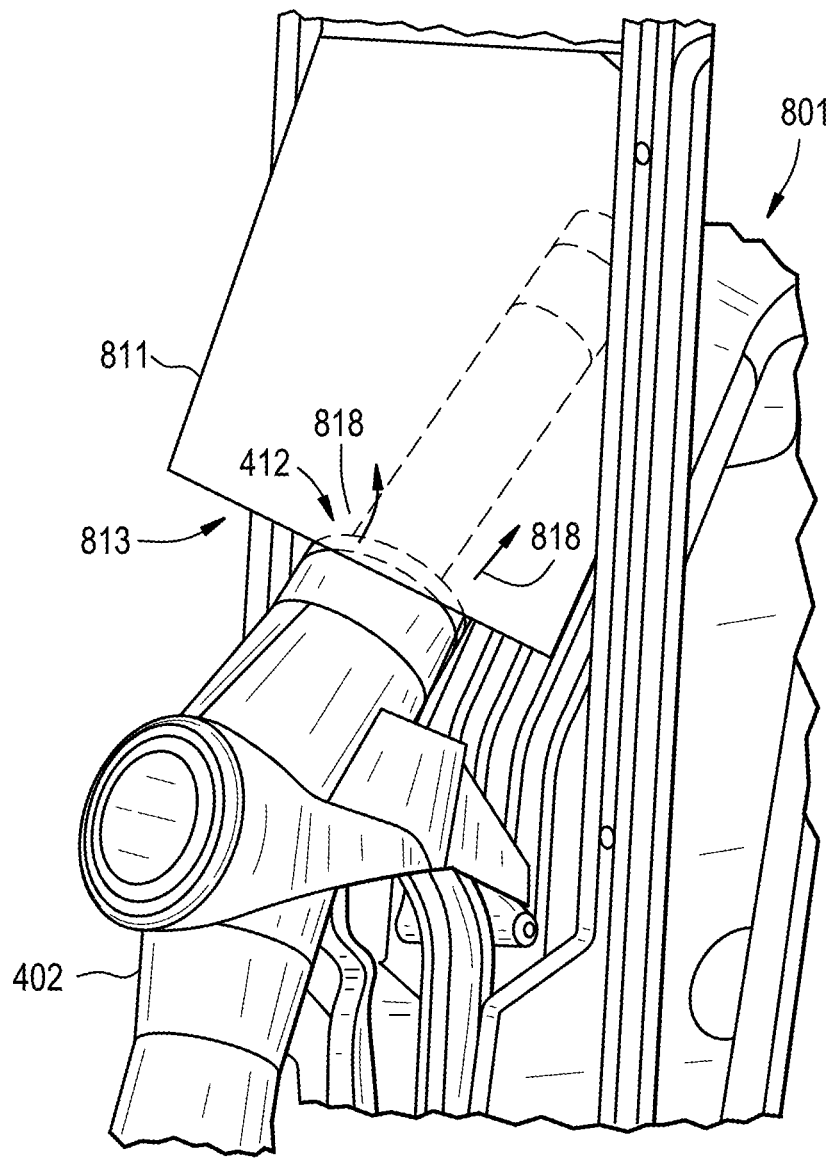
FIG. 27 is a perspective view of an embodiment of a fuel dispensing device including an air containment mechanism.

FIG. 27 illustrates an embodiment of a fuel dispensing device 801 configured to heat fluid that can be dispensed therefrom. The fuel dispensing device 801 is the same as the device 401 of FIGS. 16-20 except that the device 801 of FIG. 27 includes an air containment mechanism configured to facilitate heating of the fuel dispensing device's nozzle 402 using heated air that exits the nozzle 402 through the air exit opening 412, as shown by air exit arrows 818. The air containment mechanism in this illustrated embodiment is located at a portion of a fuel dispensing device's housing that seats the nozzle and includes a cavity 813 defined by the nozzle boot 403 and a cover 811 such that the cavity 813 has closed walls except for an open bottom through which the nozzle 402 can extend when seated in the boot 403. The air containment mechanism can thus be configured to help contain the heated air that exits the air exit opening 412 in proximity to the nozzle 402 and in particular in proximity to a distal portion thereof including the fluid exit opening 410. The cover 811 in this illustrated embodiment includes a rectangular plate, but the cover 811 can have other shapes and sizes in accordance with, e.g., size and shape of the nozzle, size and shape of the nozzle boot, location of the air exit opening, etc.

In some embodiments, a sensor configured to sense ambient temperature can be disposed within the cavity 813, e.g., attached to the cover 811, attached to a wall of the fuel dispensing device 801 within the nozzle boot 803, etc. The sensed temperature can be used to help control heating, as discussed above.

Figure 28:
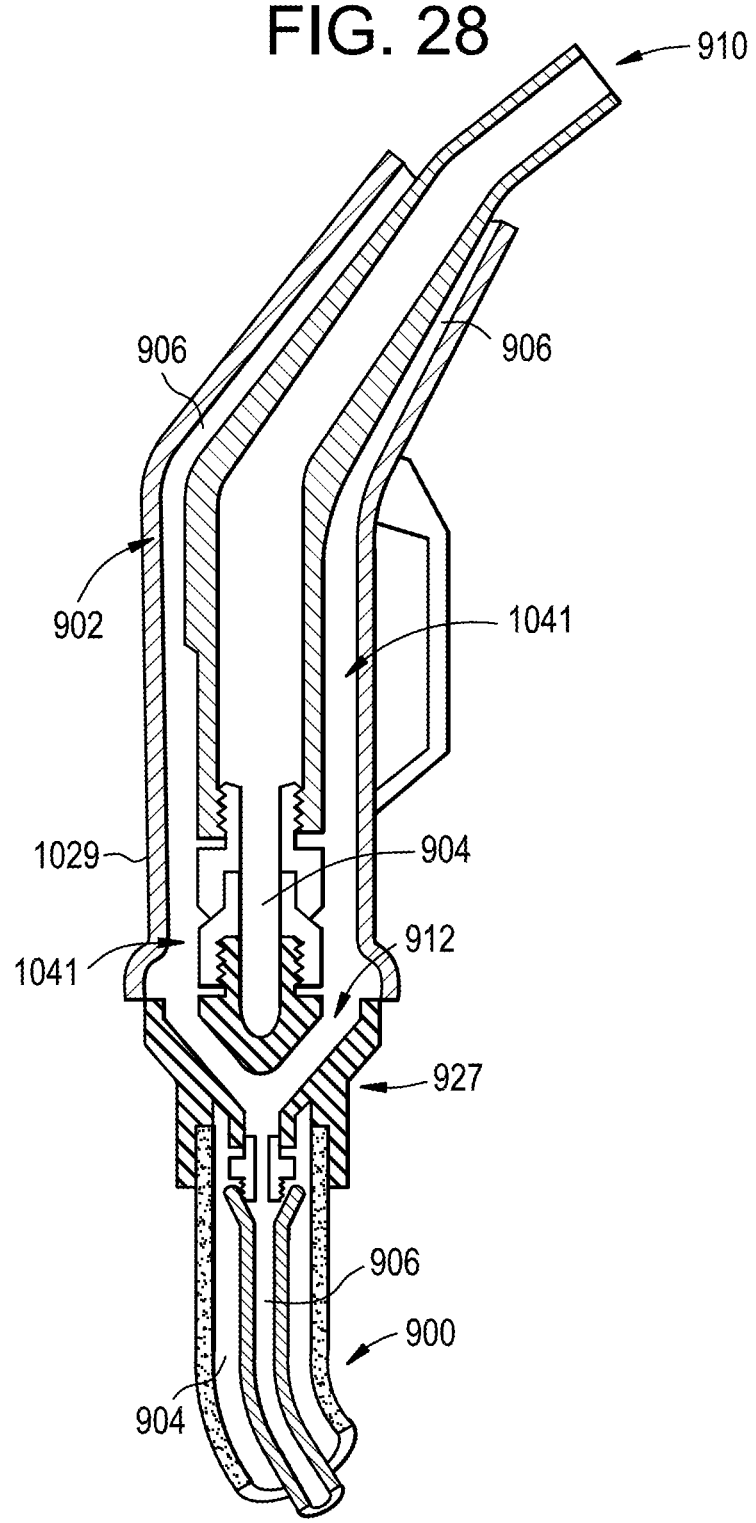
FIG. 28 is a schematic cross-sectional view of the fuel dispensing device of FIG. 26 including an air containment mechanism.

FIG. 28 illustrates an embodiment of a fuel dispensing device configured to heat fluid 1004 that can be dispensed therefrom. The fuel dispensing device is the same as the device of FIG. 26 except that the device of FIG. 28 includes an air containment mechanism 1029 configured to facilitate heating of the fuel dispensing device's nozzle 902 using heated air that exits the air exit opening 912 into a gap of space 1041 defined between the nozzle 902 and the air containment mechanism 1029 and between the air diverter 927 and the air containment mechanism 1029. The air containment mechanism 1029 can be configured to help contain heated air that exits the hose 900 around an exterior of the nozzle 902 in an embodiment in which heated air is directed distally. In an embodiment in which heated air is directed proximally into the hose 900, the air containment mechanism 1029 can be configured to help direct the heated air around an exterior of the nozzle 902.

The air containment mechanism 1029 can be disposed around at least a portion of the nozzle 902, e.g., a proximal portion, to facilitate heating of the nozzle 902. As in this illustrated embodiment, the air containment mechanism 1029 can be located entirely proximally to the fluid exit opening 910, e.g., entirely proximally to a distal end of the nozzle's spout. Such placement can help avoid the air containment mechanism 1029 from getting in the way of the fluid 904 being dispensed from the nozzle 902 while helping to heat the nozzle 902 with heated air.

The air containment mechanism 1029 can be in fluid communication with the air diverter 927, thereby allowing the air 906 to pass freely between the air diverter 927 and the air containment mechanism 1029.

The air containment mechanism 1029 can be configured to be removably and replaceably coupled to the fuel dispensing device, such as by being configured to clamp thereon and unclamp therefrom, by being configured to be snap fit onto and off from the nozzle 902, etc. The air containment mechanism 1029 being removable and replaceable can facilitate retrofitting the air containment mechanism 1029 to existing nozzles and/or can facilitate repair, cleaning, etc. of the nozzle 902. In other embodiments, the air containment mechanism 1029 can be non-removably attached to the fuel dispensing device, such as by being integrally formed with the fuel dispensing device, by being welded thereto, etc.

The air containment mechanism 1029 has a generally cylindrical shape in this illustrated embodiment so as to correspond to the generally cylindrical outer shape of this illustrated embodiment's nozzle 902, but the air containment mechanism 1029 can have other shapes.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fuel dispensing device, comprising:
    a hose configured to pass fluid therethrough;
    a nozzle attached to a distal end of the hose, the nozzle being configured to receive the fluid from the hose, the nozzle being configured to dispense the fluid from a distal end thereof, and the nozzle being configured to pass air therethrough such that air is allowed to pass through an opening of the nozzle, the fluid and the air being prevented from mixing together within the nozzle;
    a housing having a cavity configured to releasably seat the nozzle therein;
    a heat element configured to heat the air passing through the nozzle;

a sensor configured to sense an ambient outdoor temperature; and a controller configured to allow the heat element to provide heat therefrom when the sensed temperature is below a predetermined threshold temperature, and the controller being configured to prevent the heat element from providing heat when the sensed temperature is above the predetermined threshold temperature.

2. The device of claim 1, further comprising a cover covering at least a portion of the cavity; and
wherein the housing has a bottom end, a top end, and a side extending between the top and bottom ends, the cover and the housing cooperating such that the cavity is open toward the bottom end and closed toward the top end and the side.

3. The device of claim 2, wherein the cover is in a fixed position relative to the housing such that the nozzle is configured to be selectively removed from and replaced into the cavity without the cover moving relative to the housing.

4. The device of claim 2, wherein the nozzle has a second opening configured to pass the fluid therethrough and out of the nozzle, and the cover extends outside of the housing and covers the opening of the nozzle and the second opening of the nozzle when the nozzle is seated in the cavity.

5. The device of claim 1, wherein the housing has a bottom end, a top end, and a side extending between the top and bottom ends, the cavity being formed in the side, and the cavity being enclosed except for an open portion facing the bottom end.

6. The device of claim 1, wherein the hose is configured to pass the air therethrough, the nozzle being configured to receive the air from the hose.

7. The device of claim 1, further comprising an air supply configured to force the air in a distal direction such that the air is driven in a distal direction out of the opening and into the cavity.

8. The device of claim 1, wherein the hose and the nozzle have a first passageway extending therethrough that is configured to pass the fluid therethrough, and the hose and the nozzle have a second passageway extending therethrough that is configured to pass the air therethrough, the first and second passageways being independent from one another so as to prevent the fluid and the air from mixing together within the nozzle and from mixing together within the hose, and the first passageway being adjacent to the second passageway such that the air in the second passageway is configured to heat the fluid in the first passageway.

9. The device of claim 1, further comprising a meter configured to measure an amount of the fluid that is dispensed from the nozzle.

10. The device of claim 1, wherein the fluid comprises diesel exhaust fluid (DEF).

11. The device of claim 1, wherein the heat element comprises a heat cable.

12. The device of claim 1, wherein the heat element comprises a positive temperature coefficient (PTC) heater.

13. A fuel dispensing device, comprising:
a hose having a first passageway extending longitudinally therethrough, the first passageway being configured to pass fluid therethrough;
a nozzle attached to a distal end of the hose, the first passageway extending therethrough such that the fluid is allowed to be dispensed from the nozzle, and the nozzle including a second passageway extending therethrough and being configured to pass air therethrough such that air is allowed to pass through an opening of the nozzle, the second passageway being adjacent to and independent from the first passageway;

a heat element configured to heat the air passing through the second passageway;

a sensor configured to sense a temperature adjacent the opening of the nozzle; and a controller configured to allow the heat element to provide heat therefrom when the sensed temperature is below a predetermined threshold temperature, and the controller being configured to prevent the heat element from providing heat when the sensed temperature is above the predetermined threshold temperature.

14. The device of claim 13, further comprising a housing from which the hose extends, the housing including a boot configured to releasably seat the nozzle such that a user can selectively seat the nozzle in the boot and unseat the nozzle from the boot, the sensor being configured to sense the temperature within the boot.

15. The device of claim 14, further comprising a cover attached to the housing, the cover being configured to shield the boot so as to facilitate containment of the heated air within the boot.

16. The device of claim 14, further comprising a meter coupled to the housing and configured to measure an amount of the fluid that is dispensed from the nozzle.

17. The device of claim 13, wherein the second passageway is disposed within the first passageway.

18. The device of claim 13, wherein the hose also has the second passageway extending therethrough.

19. The device of claim 13, wherein the fluid comprises diesel exhaust fluid (DEF).

20. The device of claim 13, further comprising a pump configured to pump the air through the second passageway in a distal direction such that the air is forced through the opening in a distal direction.

21. The device of claim 13, wherein the temperature sensed by the sensor is an ambient air temperature outside of the nozzle.

22. The device of claim 13, further comprising a manifold having a first opening configured to communicate with the first and second passageways, having a second opening in fluid communication with the first opening and configured to communicate with a fluid supply that supplies the fluid to the first passageway, and having a third opening in fluid communication with the first opening and configured to communicate with an air supply that supplies the air to the second passageway, the manifold being configured to prevent the fluid passing through the first and second openings from mixing with the air passing through the first and third openings.

23. A fuel dispensing method, comprising:
allowing passage of fluid through a first passageway of a fuel dispensing system and out of the fluid dispensing system through a nozzle of the fuel dispensing system;
forcing heated air through a second passageway of the fuel dispensing system, the second passageway being adjacent to the first passageway such that the heated air within the second passageway heats the fluid within the first passageway, and the first passageway being separate from the second passageway so as to prevent the heated air within the second passageway from mixing with the fluid within the first passageway;
allowing the heated air to exit the second passageway into a cavity of the fuel dispensing system;
sensing an ambient outdoor temperature; and
heating the air when the sensed temperature is below a predetermined threshold temperature and not heating the air when the temperature is above the predetermined threshold temperature.

\* \* \* \* \*